US 12,158,991 B2
(12) United States Patent
Matuszak et al.

(10) Patent No.: US 12,158,991 B2
(45) Date of Patent: Dec. 3, 2024

(54) SMART-DEVICE-BASED RADAR SYSTEM PERFORMING GESTURE RECOGNITION USING A SPACE TIME NEURAL NETWORK

(71) Applicant: Google LLC, Mountain View, CA (US)

(72) Inventors: Michal Matuszak, Sunnyvale, CA (US); Abel Seleshi Mengistu, Mountain View, CA (US); Nicholas Edward Gillian, Palo Alto, CA (US); Abhijit Aroon Shah, Foster City, CA (US)

(73) Assignee: Google LLC, Mountain View, CA (US)

( * ) Notice: Subject to any disclaimer, the term of this patent is extended or adjusted under 35 U.S.C. 154(b) by 427 days.

(21) Appl. No.: 17/634,857

(22) PCT Filed: Oct. 20, 2020

(86) PCT No.: PCT/US2020/056505
§ 371 (c)(1),
(2) Date: Feb. 11, 2022

(87) PCT Pub. No.: WO2021/086688
PCT Pub. Date: May 6, 2021

(65) Prior Publication Data
US 2022/0326367 A1 Oct. 13, 2022

Related U.S. Application Data

(60) Provisional application No. 62/928,029, filed on Oct. 30, 2019.

(51) Int. Cl.
*G06F 3/01* (2006.01)
*G01S 13/06* (2006.01)
(Continued)

(52) U.S. Cl.
CPC .............. *G06F 3/017* (2013.01); *G01S 13/06* (2013.01); *G06F 3/011* (2013.01); *G06V 10/82* (2022.01); *G06V 10/94* (2022.01); *G06V 40/28* (2022.01)

(58) Field of Classification Search
CPC ........ G06F 3/017; G06F 3/011; G06V 40/28; G06V 10/82; G06V 10/94; G01S 13/06
See application file for complete search history.

(56) References Cited

U.S. PATENT DOCUMENTS

| 10,108,903 B1* | 10/2018 | Piao ...................... G06N 3/0464 |
| 2013/0194287 A1* | 8/2013 | Nicholson ............... G06F 3/005 |
| | | 345/547 |

(Continued)

FOREIGN PATENT DOCUMENTS

| JP | 2018170003 | 11/2018 |
| WO | 2019104228 | 5/2019 |

(Continued)

OTHER PUBLICATIONS

Daw-Tung Lin, "Spatio-temporal hand gesture recognition using neural networks," 1998 IEEE International Joint Conference on Neural Networks Proceedings. IEEE World Congress on Computational Intelligence (Cat. No. 98CH36227), Anchorage, AK, USA, 1998, pp. 1794-1798 vol. 3, doi: 10.1109/IJCNN.1998.687129. (Year: 1998).*

(Continued)

*Primary Examiner* — Vladimir Magloire
*Assistant Examiner* — Noah Yi Min Zhu
(74) *Attorney, Agent, or Firm* — Colby Nipper PLLC

(57) ABSTRACT

Techniques and apparatuses are described that implement a smart-device-based radar system capable of performing gesture recognition using a space time neural network. The space time neural network employs machine learning to (Continued)

recognize a user's gesture based on complex radar data. The space time neural network is implemented using a multi-stage machine-learning architecture, which enables the radar system to conserve power and recognize the user's gesture in real time (e.g., as the gesture is performed). The space time neural network is also adaptable and can be expanded to recognize multiple types of gestures, such as a swipe gesture and a reach gesture, without significantly increasing size, computational requirements, or latency.

20 Claims, 14 Drawing Sheets

(51) Int. Cl.
*G06V 10/82* (2022.01)
*G06V 10/94* (2022.01)
*G06V 40/20* (2022.01)

(56) References Cited

U.S. PATENT DOCUMENTS

| | | | |
|---|---|---|---|
| 2014/0002338 A1* | 1/2014 | Raffa | G06F 3/0346 345/156 |
| 2014/0240223 A1* | 8/2014 | Lake | G06F 3/011 345/156 |
| 2018/0046255 A1* | 2/2018 | Rothera | G01S 13/56 |
| 2019/0049558 A1* | 2/2019 | Yung | G06F 3/017 |
| 2019/0108740 A1* | 4/2019 | Coke | G08B 29/186 |
| 2019/0146583 A1* | 5/2019 | Seth | G06F 3/014 345/156 |
| 2020/0293064 A1* | 9/2020 | Wu | G06N 3/045 |
| 2020/0302210 A1* | 9/2020 | Santra | G01S 13/878 |

FOREIGN PATENT DOCUMENTS

| | | |
|---|---|---|
| WO | 2019195327 | 10/2019 |
| WO | 2021086688 | 5/2021 |

OTHER PUBLICATIONS

Y. Wang, S. Wang, M. Zhou, Q. Jiang and Z. Tian, "TS-I3D Based Hand Gesture Recognition Method With Radar Sensor," in IEEE Access, vol. 7, pp. 22902-22913, 2019, doi: 10.1109/ACCESS.2019.2897060. (Year: 2019).*

Z. Zhang, Z. Tian and M. Zhou, "Latern: Dynamic Continuous Hand Gesture Recognition Using FMCW Radar Sensor," in IEEE Sensors Journal, vol. 18, No. 8, pp. 3278-3289, 15 Apr. 15, 2018, doi: 10.1109/JSEN.2018.2808688. (Year: 2018).*

"Foreign Office Action", IN Application No. 202247011538, Aug. 4, 2022, 5 pages.

"Foreign Office Action", JP Application No. 2022-515765, Jun. 27, 2023, 11 pages.

"International Preliminary Report on Patentability", Application No. PCT/US2020/056505, Jan. 31, 2022, 12 pages.

"International Search Report and Written Opinion", Application No. PCT/US2020/056505, Apr. 26, 2021, 19 pages.

"Invitation to Pay Additional Fees", PCT Application No. PCT/US2020/056505, Feb. 11, 2021, 10 pages.

Berenguer, "GestureVLAD: Combining Unsupervised Features Representation and Spatio-Temporal Aggregation for Doppler-Radar Gesture Recognition", IEEE Access, vol. 7, Sep. 19, 2019, 15 pages.

Wang, et al., "TS-I3D Based Hand Gesture Recognition Method With Radar Sensor", IEEE Access, Feb. 4, 2019, 12 pages.

Zhang, et al., "Latern: Dynamic Continuous Hand Gesture Recognition Using FMCW Radar Sensor", IEEE Sensors Journal, vol. 18, No. 8, Apr. 15, 2018, 12 pages.

"Foreign Office Action", JP Application No. 2022-515765, Dec. 26, 2023, 4 pages.

"Foreign Office Action", EP Application No. 20807201.7, Jul. 5, 2024, 5 pages.

"Foreign Office Action", KR Application No. 10-2022-7008000, Jul. 22, 2024, 9 pages.

"Foreign Office Action", CN Application No. 202080064138.1, Aug. 27, 2024, 26 pages.

* cited by examiner

SMART-DEVICE-BASED RADAR SYSTEM PERFORMING GESTURE RECOGNITION USING A SPACE TIME NEURAL NETWORK

RELATED APPLICATION(S)

This application is a national stage entry of International Application No. PCT/US2020/056505, filed Oct. 20, 2020, which claims the benefit of U.S. Provisional Application No. 62/928,029, filed Oct. 30, 2019, the disclosures which are incorporated herein by reference in their entirety.

BACKGROUND

Radars are useful devices that can detect objects. Relative to other types of sensors, like a camera, a radar can provide improved performance in the presence of different environmental conditions, such as low lighting and fog, or with moving or overlapping objects. Radar can also detect objects through one or more occlusions, such as a purse or a pocket. While radar has may advantages, there are many challenges associated with integrating radar in electronic devices.

One challenge involves power constraints within small or mobile electronic devices. Operation of some radars significantly drain a battery of an electronic device and cause a user to frequently recharge the electronic device. Consequently, advantages of utilizing the radar may not be realized with the effective operation of the radar curtailed or disabled due to limitations of available power.

Another challenge involves restrictions that a small consumer device may impose on a radar's design or operation. To satisfy size or layout constraints, for example, fewer antenna elements and various antenna element spacings may be used. Other constraints may limit a bandwidth of a radar signal, transmission power, or an update rate. Consequently, the radar's design may result in degraded signal-to-noise ratio performance, which may make it challenging to achieve sufficient accuracies for some applications. As such, performance of a radar integrated within an electronic device may be significantly reduced. This can limit the types of applications the radar can support or the types of electronic devices that can incorporate the radar.

SUMMARY

Techniques and apparatuses are described that implement a smart-device-based radar system capable of performing gesture recognition using a space time neural network. The space time neural network employs machine learning to analyze complex radar data (e.g., both magnitude and phase information) for gesture recognition. By analyzing both magnitude and phase information, the space time neural network can realize improved accuracies for detecting distributed objects and recognizing gestures relative to other signal-processing techniques, heuristic techniques, or machine-learning techniques that process magnitude information.

The space time neural network is implemented using a multi-stage machine-learning architecture. In a first stage, a space-recurrent network analyzes the complex radar data over a spatial domain to generate feature data. The feature data identifies one or more features (e.g., characteristics) of a gesture performed by a user. The feature data is stored in a memory element of a circular buffer for at least a portion of time. As time progresses, other feature data is stored in other memory elements of the circular buffer. In a second stage, the time-recurrent network analyzes the feature data over a temporal domain to recognize the gesture.

This multi-stage design enables a radar system to conserve power and recognize the gesture in real time (e.g., as the gesture is performed). Use of the circular buffer, for example, enables the radar system to conserve power and memory by mitigating the need to regenerate the feature data or store the complex radar data. Storing the feature data instead of the complex radar data also reduces the computational time for recognizing the gesture. The space time neural network is also adaptable and can be expanded to recognize multiple types of gestures, such as a swipe gesture and a reach gesture, without significantly increasing size, computational requirements, or latency.

Aspects described below include a method performed by a radar system for gesture recognition. The method includes transmitting a radar transmit signal using an antenna array of the radar system. The method also includes receiving a radar receive signal using the antenna array. The radar receive signal comprises a version of the radar transmit signal that is reflected by at least one user. The method additionally includes generating complex radar data based on the radar receive signal and providing the complex radar data to a space time neural network of the radar system. The space time neural network comprises a multi-stage machine-learning architecture. The method further includes analyzing the complex radar data using the space time neural network to recognize a gesture performed by the at least one user.

Aspects described below also include an apparatus comprising a radar system. The radar system comprising an antenna array and a transceiver. The radar system also includes a processor and computer-readable storage media configured to perform any of the described methods.

Aspects described below include a computer-readable storage media comprising computer-executable instructions that, responsive to execution by a processor, implement a space time neural network configured to accept complex radar data associated with a radar receive signal that is reflected by at least one object. The space time neural network is also configured to analyze, using machine learning, the complex radar data over a spatial domain to generate feature data. Additionally, the space time neural network is configured to analyze, using machine learning, the feature data over a temporal domain to generate radar-application data. The space time neural network is configured to pass the radar-application data to a radar-based application.

Aspects described below also include a system with space time neural network means for performing gesture recognition based on complex radar data.

BRIEF DESCRIPTION OF THE DRAWINGS

Apparatuses for and techniques implementing a smart-device-based radar system capable of performing gesture recognition using a space time neural network are described with reference to the following drawings. The same numbers are used throughout the drawings to reference like features and components:

FIG. 3-1 illustrates operation of an example radar system.

FIG. 3-2 illustrates an example radar framing structure for gesture recognition.

FIG. 6-1 illustrates an example hardware-abstraction module for gesture recognition.

FIG. 6-2 illustrates example hardware-agnostic complex radar data generated by a hardware-abstraction module for gesture recognition.

FIG. 7-1 illustrates an example space time neural network for performing gesture recognition.

FIG. 7-2 illustrates an example chirp-level analysis module of a space time neural network.

FIG. 7-3 illustrates an example feature-level analysis module of a space time neural network.

FIG. 7-4 illustrates an example application-level analysis module of a space time neural network.

DETAILED DESCRIPTION

Overview

Figure 1:
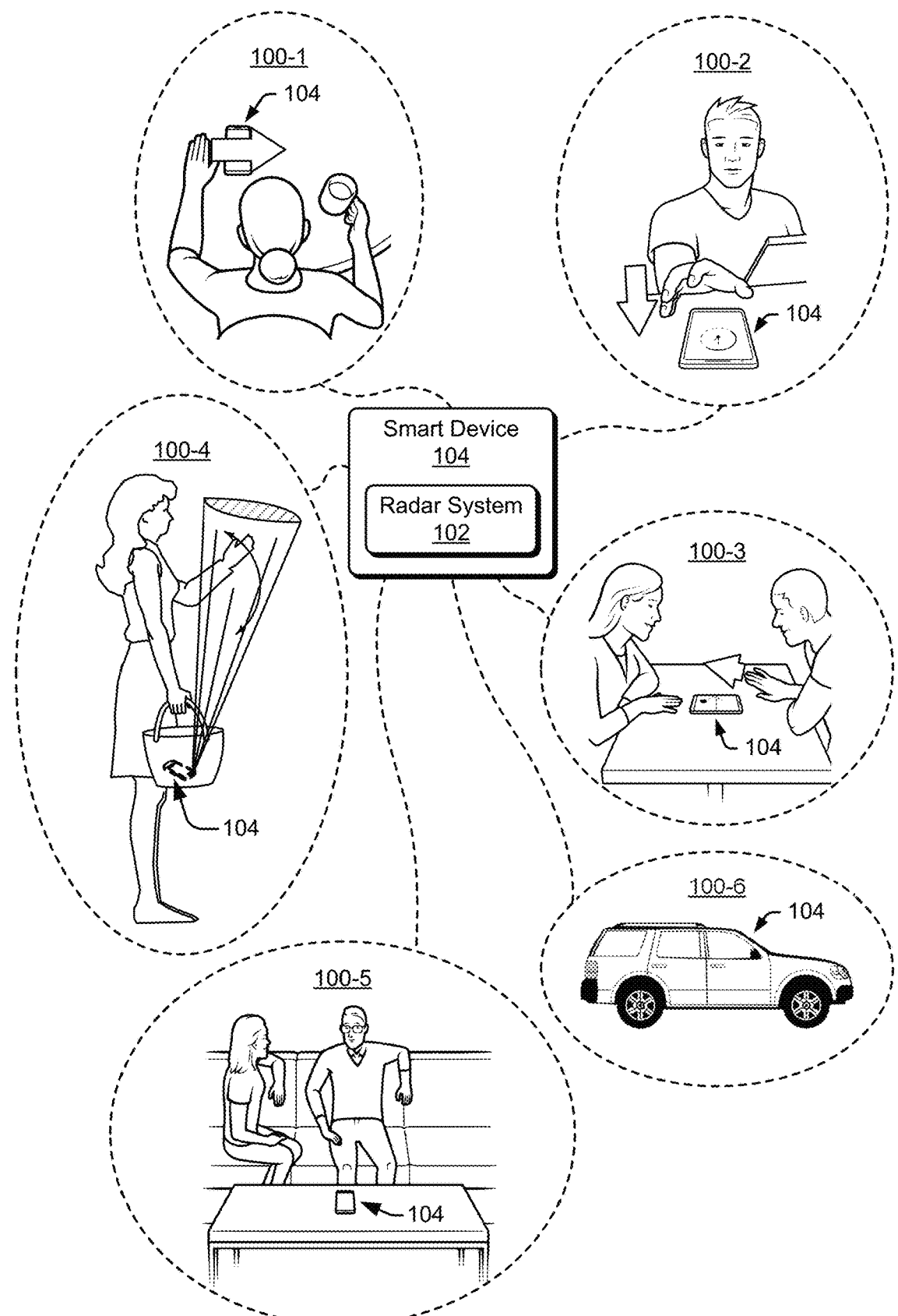
FIG. 1 illustrates example environments in which a smart-device-based radar system capable of performing gesture recognition using a space time neural network can be implemented.

Integrating a radar system within an electronic device can be challenging. The electronic device, for example, may have a limited amount of available power. As such, the radar system may not be able to increase transmission power or utilize higher update rates. In some cases, a size or layout constraint of the electronic device may limit a quantity of antenna elements or result in a sub-optimal antenna element spacing, which can limit angular resolution. Other hardware limitations or frequency limitations may limit a bandwidth of a radar signal, which can limit range resolution for radars that use pulse-compression techniques. With these limitations, it may be challenging for some radars to achieve target accuracies.

Target accuracies may also be challenging to realize for detecting distributed objects, which have non-deterministic radar signatures. Example types of distributed objects include human body parts (e.g., finger, hand, face, or appendage) or a human body. From a radar's perspective, a distributed object has multiple phase centers (e.g., scattering points), which cause a radar signature of the distributed object to vary across different observation angles. While observing a distributed object, the observation angle can change due to motion of the distributed object or motion of the radar. As the observation angle changes, an amplitude or phase of the radar signature may vary, which increases an error or uncertainty in position data produced using radar processing techniques appropriate for non-distributed objects (e.g., objects with deterministic radar signatures).

To address these problems, this document describes techniques and devices that implement a smart-device-based radar system capable of performing gesture recognition using a space time neural network. The space time neural network employs machine learning to analyze complex radar data (e.g., both magnitude and phase information) for gesture recognition. By analyzing both magnitude and phase information, the space time neural network can realize improved accuracies for detecting distributed objects and recognizing gestures relative to other signal-processing techniques, heuristic techniques, or machine-learning techniques that process magnitude information. Unless indicated otherwise by the particular context herein, increased accuracy refers to an increased degree of refinement, an increased conformity to truth, or both the increased degree of refinement and the increased conformity to truth.

The space time neural network is implemented using a multi-stage machine-learning architecture. In a first stage, a space-recurrent network analyzes the complex radar data over a spatial domain to generate feature data. The feature data identifies one or more features (e.g., characteristics) of a gesture performed by a user. The feature data is stored in a memory element of a circular buffer for at least a portion of time. As time progresses, other feature data is stored in other memory elements of the circular buffer. In a second stage, the time-recurrent network analyzes the feature data over a temporal domain to recognize the gesture.

This multi-stage design enables a radar system to conserve power and recognize the gesture in real time (e.g., as the gesture is performed). Use of the circular buffer, for example, enables the radar system to conserve power and memory by mitigating the need to regenerate the feature data or store the complex radar data. Storing the feature data instead of the complex radar data also reduces the computational time for recognizing the gesture. The space time neural network is also adaptable and can be expanded to recognize multiple types of gestures, such as a swipe gesture and a reach gesture, without significantly increasing size, computational requirements, or latency.

Example Environment

FIG. 1 is an illustration of example environments 100-1 to 100-6 in which techniques using, and an apparatus including, a smart-device-based radar system capable of performing gesture recognition using a space time neural network may be embodied. In the depicted environments 100-1 to 100-6, a smart device 104 includes a radar system 102 capable of detecting one or more objects (e.g., users) using a space time neural network (of FIG. 2). The smart device 104 is shown to be a smartphone in environments 100-1 to 100-5 and a smart vehicle in the environment 100-6.

In the environments 100-1 to 100-4, a user performs different types of gestures, which are detected by the radar system 102. In some cases, the user performs a gesture using an appendage or body part. Alternatively, the user can also perform a gesture using a stylus, a hand-held object, a ring, or any type of material that can reflect radar signals.

In environment 100-1, the user makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). In the environment 100-4, the smart device 104 is stored within a purse, and the radar system 102 provides occluded-gesture recognition by detecting gestures that are occluded by the purse.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment 100-5, the radar system 102 generates a three-dimensional map of a surrounding environment for contextual awareness. The radar system 102 also detects and tracks multiple users to enable both users to interact with the smart device 104. The radar system 102 can also perform vital-sign detection. In the environment 100-6, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life-threatening emergency, such as a heart attack, the radar system 102 can cause the smart device 104 to alert a medical professional or emergency services.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth). The smart device 104 and the radar system 102 are further described with respect to FIG. 2.

Figure 2:
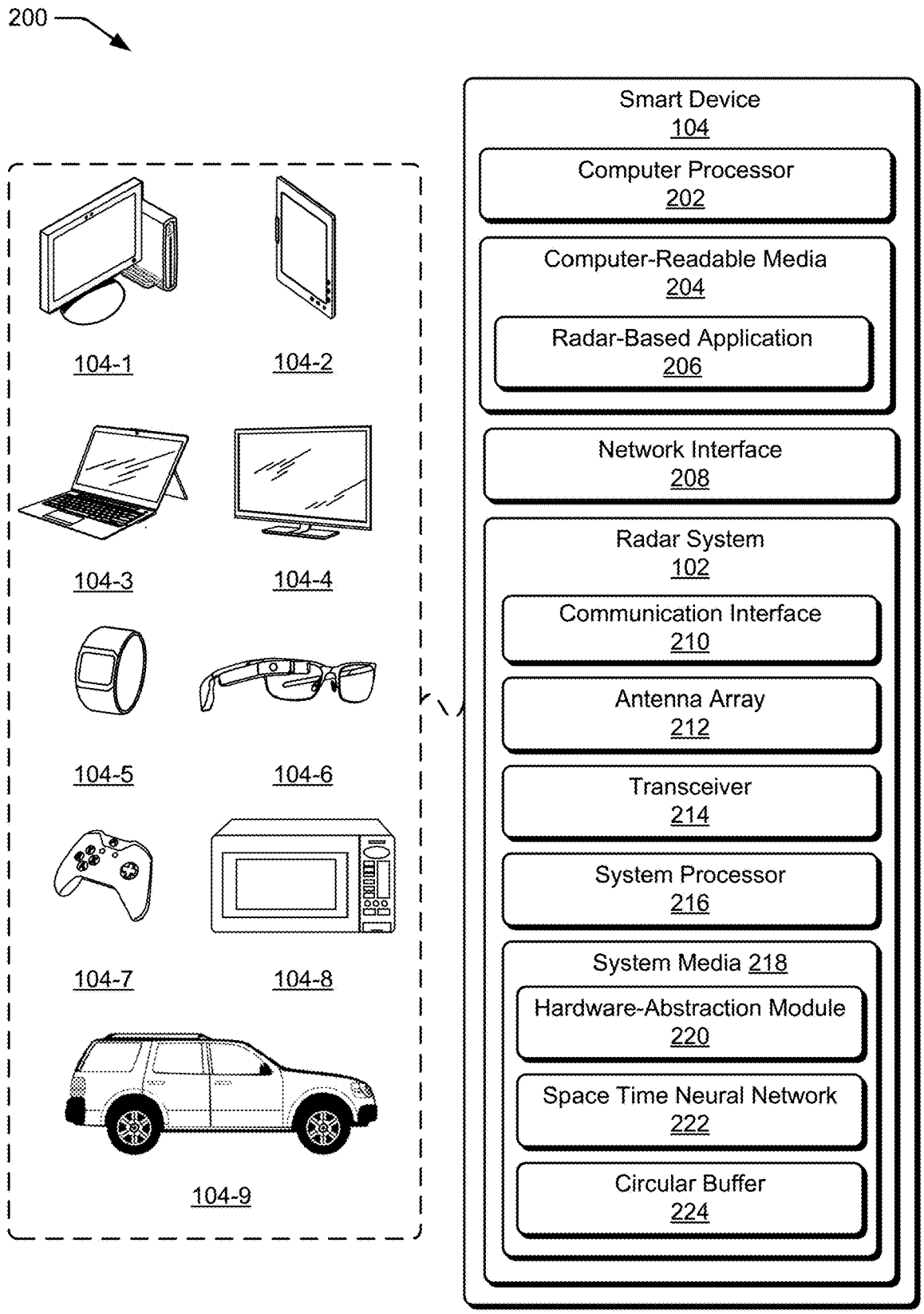
FIG. 2 illustrates an example implementation of a radar system as part of a smart device.

FIG. 2 illustrates the radar system 102 as part of the smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a router, a Wi-Fi™ router, a drone, a trackpad, a drawing pad, a netbook, an e-reader, a home-automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g.,volume, cruise control, or even driving of the car), or as an attachment to a laptop computer to control computing applications on the laptop.

The smart device 104 includes one or more computer processors 202 and one or more computer-readable media 204, which includes memory media and storage media. Applications and/or an operating system (not shown) embodied as computer-readable instructions on the computer-readable media 204 can be executed by the computer processor 202 to provide some of the functionalities described herein. The computer-readable media 204 also includes a radar-based application 206, which uses radar data generated by the radar system 102 to perform a function, such as presence detection, gesture-based touch-free control, collision avoidance for autonomous driving, human vital-sign notification, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 210 to transmit the radar data to a remote device, though this need not be used when the radar system 102 is integrated within the smart device 104. In general, the radar data provided by the communication interface 210 is in a format usable by the radar-based application 206.

The radar system 102 also includes at least one antenna array 212 and at least one transceiver 214 to transmit and receive radar signals. The antenna array 212 includes at least one transmit antenna element and at least two receive antenna elements. In some situations, the antenna array 212 includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

The receive antenna elements of the antenna array 212 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of an object). An element spacing associated with the receive antenna elements can be less than, greater than, or equal to half a center wavelength of the radar signal.

Using the antenna array 212, the radar system 102 can form beams that are steered or un-steered, wide or narrow, or shaped (e.g., hemisphere, cube, fan, cone, cylinder). The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds or thousands of narrow steered beams with digital beamforming. In this way, the radar system 102 can efficiently monitor an external environment and detect one or more users.

The transceiver 214 includes circuitry and logic for transmitting and receiving radar signals via the antenna array 212. Components of the transceiver 214 can include amplifiers, mixers, switches, analog-to-digital converters, or filters for conditioning the radar signals. The transceiver 214 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 216 and one or more system media 218 (e.g., one or more computer-readable storage media). The system media 218 optionally includes a hardware-abstraction module 220. The system media 218 also includes at least one space time neural network 222 and at least one circular buffer 224. The hardware-abstraction module 220, the space time neural network 222, and the circular buffer 224 can be implemented using hardware, software, firmware, or a combination thereof. In this example, the system processor 216 implements the hardware-abstraction module 220 and the space time neural network 222. The system processor 216 or a memory controller can implement and manage the circular buffer 224. Together, the hardware-abstraction module 220, the space time neural network 222, and the circular buffer 224 enable the system processor 216 to process responses from the receive antenna elements in the antenna array 212 to detect a user, determine a position of the object, and/or recognize a gesture performed by the user 302.

In an alternative implementation (not shown), the hardware-abstraction module 220, the space time neural network 222, or the circular buffer 224 are included within the computer-readable media 204 and implemented by the computer processor 202. This enables the radar system 102 to provide the smart device 104 raw data via the communication interface 210 such that the computer processor 202 can process the raw data for the radar-based application 206.

The hardware-abstraction module 220 transforms raw data provided by the transceiver 214 into hardware-agnostic complex radar data, which can be processed by the space time neural network 222. In particular, the hardware-abstraction module 220 conforms complex radar data from a variety of different types of radar signals to an expected input of the space time neural network 222. This enables the space time neural network 222 to process different types of radar signals received by the radar system 102, including those that utilize different modulations schemes for frequency-modulated continuous-wave radar, phase-modulated spread spectrum radar, or impulse radar. The hardware-abstraction module 220 can also normalize complex radar data from radar signals with different center frequencies, bandwidths, transmit power levels, or pulsewidths.

Additionally, the hardware-abstraction module 220 conforms complex radar data generated using different hardware architectures. Different hardware architectures can include different antenna arrays 212 positioned on different surfaces of the smart device 104 or different sets of antenna elements within an antenna array 212. By using the hardware-abstraction module 220, the space time neural network 222 can process complex radar data generated by different sets of antenna elements with different gains, different sets of antenna elements of various quantities, or different sets of antenna elements with different antenna element spacings.

By using the hardware-abstraction module 220, the space time neural network 222 can operate in radar systems 102 with different limitations that affect the available radar modulation schemes, transmission parameters, or types of hardware architectures. The hardware-abstraction module 220 is further described with respect to FIGS. 6-1 to 6-2.

The space time neural network 222 uses machine learning to analyze the hardware-agnostic complex radar data and generate radar-application data for the radar-based application 206. Example types of radar-application data include a position of a user, movement of the user, a type of gesture performed by the user, a measured vital-sign of the user, or characteristics of an object. The space time neural network 222 analyzes both magnitude and phase information of the complex radar data to improve accuracies for detecting distributed objects relative to other signal-processing techniques, heuristic techniques, or machine-learning techniques that process magnitude information.

For gesture recognition, the space time neural network 222 can be designed to recognize a particular gesture or multiple gestures, such as those described above with respect to FIG. 1. In some cases, the space time neural network 222 includes a suite of machine-learning architectures that can be individually selected according to the type of smart device 104 or the radar-based application 206. Designs of the machine-learning architectures can be tailored to support smart devices 104 with different amounts of available memory, different amounts available power, or different computational capabilities. For example, a low-power, non-computationally intensive space time neural network 222 can process information from a smaller quantity of receive channels (e.g., two through four receive channels), have fewer hidden layers, or operate on input data that is compressed. In contrast, a high-power, computationally-intensive space time neural network 222 can process information from a larger quantity of receive channels (e.g., more than four receive channels), perform, have a larger quantity of hidden layers, or operate on input data that is not compressed.

The circular buffer 224 is a fixed-size memory buffer implemented using an allocated portion of memory within the system media 218. The circular buffer 224 includes multiple memory elements and provides a first-in-first-out queue in which data is sequentially stored and accessed using the memory elements. Once all of the memory elements store data, the oldest data stored within the circular buffer 224 is overwritten. The circular buffer 224 is implemented between two stages of the space time neural network 222. As such, the circular buffer 224 stores data generated by a first stage of the space time neural network 222 and enables a second stage of the space time neural network 222 to access the stored data. The circular buffer 224 is further described with respect to FIG. 7-3.

The space time neural network 222 is implemented using a multi-stage machine-learning architecture. In the first stage, a space-recurrent network analyzes the complex radar data over a spatial domain to generate feature data. The feature data identifies one or more features (e.g., characteristics) of a gesture performed by a user. In other words, the feature data is a condensed representation of the complex radar data. By representing the complex radar data using smaller components of the feature data, a complexity of a later stage within the space time neural network 222 can be significantly reduced. This can enable the space time neural network 222 to be implemented within memory constrained or computationally-limited devices.

The feature data is stored in a memory element of the circular buffer 224 for at least a portion of time. As time progresses, other feature data is stored in other memory elements of the circular buffer 224. In the second stage, a time-recurrent network analyzes the feature data across multiple memory elements within the circular buffer 224 to recognize the gesture. Together, the circular buffer 224 and the second stage extracts global or temporal information from the local information contained within the feature data, which is stored in the circular buffer 224. The space time neural network 222 is further described with respect to FIGS. 7-1 to 7-4.

Figures 1, 3:
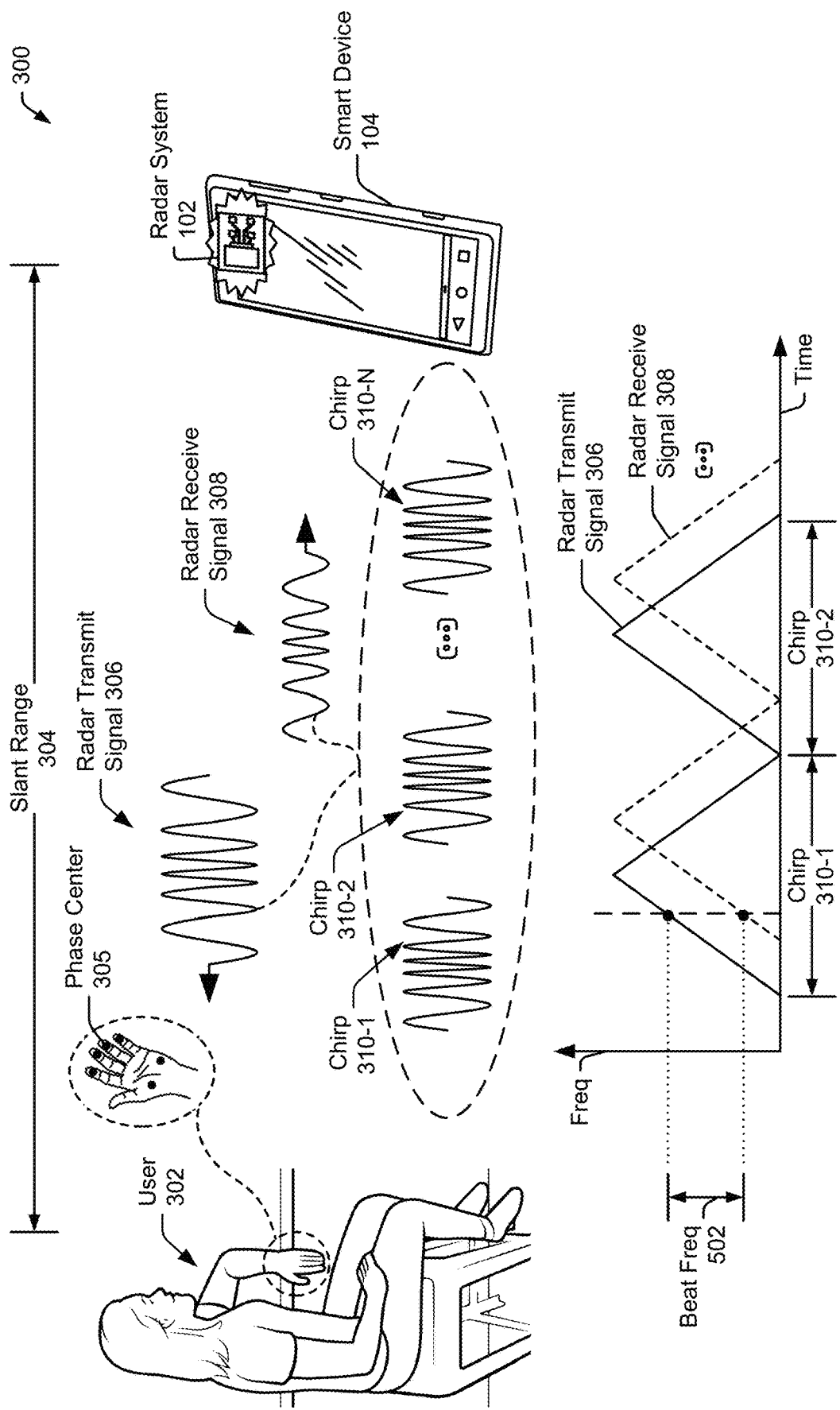
Figures 2, 3:
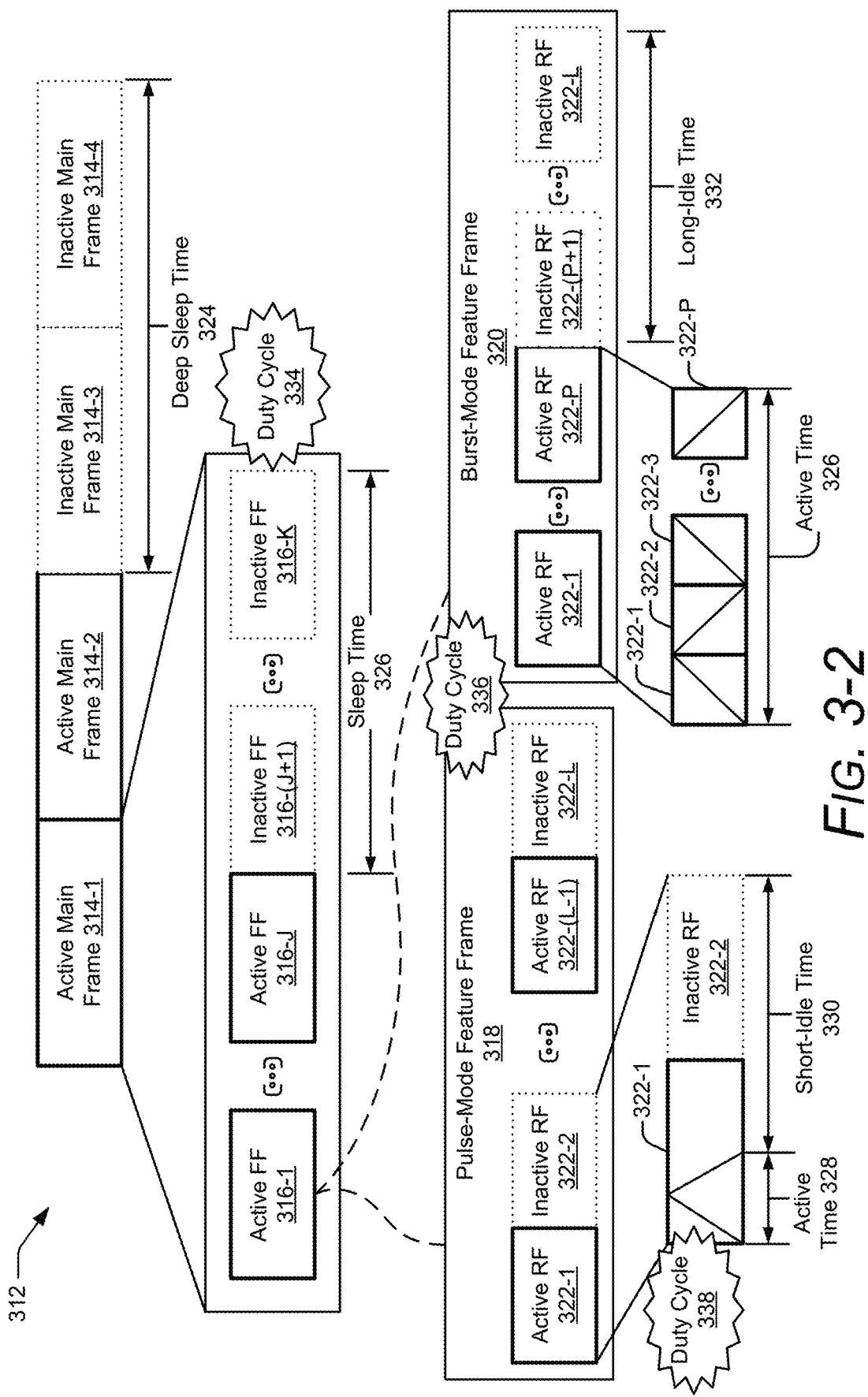

FIG. 3-1 illustrates an example operation of the radar system 102. In the depicted configuration, the radar system 102 is implemented as a frequency-modulated continuous-wave radar. However, other types of radar architectures can be implemented, as described above with respect to FIG. 2. In environment 300, a user 302 is located at a particular slant range 304 from the radar system 102. The user 302 represents a distributed object, which has multiple phase centers 305 (e.g., multiple scattering points). As an example, a hand of the user 302 has five phase centers 305 at a particular observation angle. An observation angle is an incident angle with respect to a line-of-sight along which the radar system 102 "sees" an object (e.g., the user 302's hand). The observation angle may also be considered an aspect angle if an orientation of the object's velocity vector is considered to identify the observation angle.

The quantity and respective positions of the phase centers 305 can vary at different observation angles. As the observation angle changes, such as while the user 302 performs a gesture, an amplitude or phase of the radar signature may vary. This variation, also known as speckle, can make it challenging to recognize the gesture using other signal-processing techniques, heuristic techniques, or machine-learning techniques that process magnitude information.

To detect the user 302, the radar system 102 transmits a radar transmit signal 306. At least a portion of the radar transmit signal 306 is reflected by the user 302. This reflected portion represents a radar receive signal 308. The radar system 102 receives the radar receive signal 308 and processes the radar receive signal 308 to extract data for the radar-based application 206. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-N, where N represents a positive integer greater than one. The radar system 102 can transmit the chirps 310-1 to 310-N in a continuous burst or transmit the chirps 310-1 to 310-N as time-separated pulses, as further described with respect to FIG. 3-2. A duration of each chirp 310-1 to 310-N can be on the order of tens or thousands of microseconds (e.g., between approximately 30 microseconds (μs) and 5 milliseconds (ms)), for instance.

Individual frequencies of the chirps 310-1 to 310-N can increase or decrease over time. In the depicted example, the radar system 102 employs a two-slope cycle (e.g., triangular frequency modulation) to linearly increase and linearly decrease the frequencies of the chirps 310-1 to 310-N over time. The two-slope cycle enables the radar system 102 to measure the Doppler frequency shift caused by motion of the user 302. In general, transmission characteristics of the chirps 310-1 to 310-N (e.g., bandwidth, center frequency, duration, and transmit power) can be tailored to achieve a particular detection range, range resolution, or Doppler sensitivity for detecting one or more characteristics the user 302 or one or more actions performed by the user 302.

At the radar system 102, the radar receive signal 308 represents a delayed version of the radar transmit signal 306. The amount of delay is proportional to the slant range 304 (e.g., distance) from the antenna array 212 of the radar system 102 to the user 302. In particular, this delay represents a summation of a time it takes for the radar transmit signal 306 to propagate from the radar system 102 to the user 302 and a time it takes for the radar receive signal 308 to propagate from the user 302 to the radar system 102. If the user 302 is moving, the radar receive signal 308 is shifted in frequency relative to the radar transmit signal 306 due to the Doppler effect. Similar to the radar transmit signal 306, the radar receive signal 308 is composed of one or more of the chirps 310-1 to 310-N.

The multiple chirps 310-1 to 310-N enable the radar system 102 to make multiple observations of the user 302 over a predetermined time period. A radar framing structure determines a timing of the chirps 310-1 to 310-N, as further described with respect to FIG. 3-2.

FIG. 3-2 illustrates an example radar framing structure 312 for gesture recognition. In the depicted configuration, the radar framing structure 312 includes three different types of frames. At a top level, the radar framing structure 312 includes a sequence of main frames 314, which can be in the active state or the inactive state. Generally speaking, the active state consumes a larger amount of power relative to the inactive state. At an intermediate level, the radar framing structure 312 includes a sequence of feature frames 316, which can similarly be in the active state or the inactive state. Different types of feature frames 316 include a pulse-mode feature frame 318 (shown at the bottom-left of FIG. 3-2) and a burst-mode feature frame 320 (shown at the bottom-right of FIG. 3-2). At a low level, the radar framing structure 312 includes a sequence of radar frames (RF) 322, which can also be in the active state or the inactive state.

The radar system 102 transmits and receives a radar signal during an active radar frame 322. In some situations, the radar frames 322 are individually analyzed for basic radar operations, such as search and track, clutter map generation, user location determination, and so forth. Radar data collected during each active radar frame 322 can be saved to a buffer after completion of the radar frame 322 or provided directly to the system processor 216 of FIG. 2.

The radar system 102 analyzes the radar data across multiple radar frames 322 (e.g., across a group of radar frames 322 associated with an active feature frame 316) to identify a particular feature associated with one or more radar functions (e.g., gesture recognition, presence detection, collision avoidance, or human vital sign detection). Example types of features include a particular type of motion, a motion associated with a particular appendage or gesturing apparatus (e.g., a hand, individual fingers, or a stylus), a feature associated with different portions of the gesture, and a position of at least a portion of the user or another object. To recognize a gesture performed by the user 302 during an active main frame 314, for example, the radar system 102 analyzes the radar data associated with one or more active feature frames 316.

Depending upon the type of radar function, a duration of the main frame 314 may be on the order of milliseconds or seconds (e.g., between approximately 10 ms and 10 seconds (s)). After active main frames 314-1 and 314-2 occur, the radar system 102 is inactive, as shown by inactive main frames 314-3 and 314-4. A duration of the inactive main frames 314-3 and 314-4 is characterized by a deep sleep time 324, which may be on the order of tens of milliseconds or more (e.g., greater than 50 ms). In an example implementation, the radar system 102 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 324.

In the depicted radar framing structure 312, each main frame 314 includes K feature frames 316, where K is a positive integer. If the main frame 314 is in the inactive state, all of the feature frames 316 associated with that main frame 314 are also in the inactive state. In contrast, an active main frame 314 includes J active feature frames 316 and K-J inactive feature frames 316, where J is a positive integer that is less than or equal to K. A quantity of feature frames 316 can be based on a complexity of the gesture and may include a few to a hundred feature frames 316 (e.g., K may equal 2, 10, 30, 60, or 100). A duration of each feature frame 316 may be on the order of milliseconds (e.g., between approximately 1 ms and 50 ms).

To conserve power, the active feature frames 316-1 to 316-J occur prior to the inactive feature frames 316-(J+1) to 316-K. A duration of the inactive feature frames 316-(J+1) to 316-K is characterized by a sleep time 326. In this way, the inactive feature frames 316-(J+1) to 316-K are consecutively executed such that the radar system 102 can be in a powered-down state for a longer duration relative to other techniques that may interleave the inactive feature frames 316-(J+1) to 316-K with the active feature frames 316-1 to 316-J. Generally speaking, increasing a duration of the sleep time 326 enables the radar system 102 to turn off components within the transceiver 214 that require longer start-up times.

Each feature frame 316 includes L radar frames 322, where L is a positive integer that may or may not be equal to J or K. In some implementations, a quantity of radar frames 322 may vary across different feature frames 316 and may comprise a few frames or hundreds of frames (e.g., L may equal 5, 15, 30, 100, or 500). A duration of a radar frame 322 may be on the order of tens or thousands of microseconds (e.g., between approximately 30 μs and 5 ms). The radar frames 322 within a particular feature frame 316 can be customized for a predetermined detection range, range resolution, or Doppler sensitivity, which facilitates detection of a particular feature or gesture. For example, the radar frames 322 may utilize a particular type of modulation, bandwidth, frequency, transmit power, or timing. If the feature frame 316 is in the inactive state, all of the radar frames 322 associated with that feature frame 316 are also in the inactive state.

The pulse-mode feature frame 318 and the burst-mode feature frame 320 include different sequences of radar frames 322. Generally speaking, the radar frames 322 within an active pulse-mode feature frame 318 transmit pulses that are separated in time by a predetermined amount. This disperses observations over time, which can make it easier for the radar system 102 to recognize a gesture due to larger changes in the observed chirps 310-1 to 310-N within the pulse-mode feature frame 318 relative to the burst-mode feature frame 320. In contrast, the radar frames 322 within an active burst-mode feature frame 320 transmit pulses continuously across a portion of the burst-mode feature frame 320 (e.g., the pulses are not separated by a predetermined amount of time). This enables an active-burst-mode feature frame 320 to consume less power than the pulse-mode feature frame 318 by turning off a larger quantity of components, including those with longer start-up times, as further described below.

Within each active pulse-mode feature frame 318, the sequence of radar frames 322 alternates between the active state and the inactive state. Each active radar frame 322 transmits a chirp 310 (e.g., a pulse), which is illustrated by a triangle. A duration of the chirp 310 is characterized by an active time 328. During the active time 328, components within the transceiver 214 are powered-on. During a short-idle time 330, which includes the remaining time within the active radar frame 322 and a duration of the following inactive radar frame 322, the radar system 102 conserves power by turning off one or more active components within the transceiver 214 that have a start-up time within a duration of the short-idle time 330.

An active burst-mode feature frame 320 includes P active radar frames 322 and L-P inactive radar frames 322, where P is a positive integer that is less than or equal to L. To conserve power, the active radar frames 322-1 to 322-P occur prior to the inactive radar frames 322-(P+1) to 322-L. A duration of the inactive radar frames 322-(P+1) to 322-L is characterized by a long-idle time 332. By grouping the inactive radar frames 322-(P+1) to 322-L together, the radar system 102 can be in a powered-down state for a longer duration relative to the short-idle time 330 that occurs during the pulse-mode feature frame 318. Additionally, the radar system 102 can turn off additional components within the transceiver 214 that have start-up times that are longer than the short-idle time 330 and shorter than the long-idle time 332.

Each active radar frame 322 within an active burst-mode feature frame 320 transmits a portion of the chirp 310. In this example, the active radar frames 322-1 to 322-P alternate between transmitting a portion of the chirp 310 that increases in frequency and a portion of the chirp 310 that decreases in frequency.

The radar framing structure 312 enables power to be conserved through adjustable duty cycles within each frame type. A first duty cycle 334 is based on a quantity of active feature frames 316 (J) relative to a total quantity of feature frames 316 (K). A second duty cycle 336 is based on a quantity of active radar frames 322 (e.g., L/2 or P) relative to a total quantity of radar frames 322 (L). A third duty cycle 338 is based on a duration of the chirp 310 relative to a duration of a radar frame 322.

Consider an example radar framing structure 312 for a power state that consumes approximately 2 milliwatts (mW) of power and has a main-frame update rate between approximately 1 and 4 hertz (Hz). In this example, the radar framing structure 312 includes a main frame 314 with a duration between approximately 250 ms and 1 second. The main frame 314 includes thirty-one pulse-mode feature frames 318 (e.g., K is equal to 31). One of the thirty-one pulse-mode feature frames 318 is in the active state. This results in the duty cycle 334 being approximately equal to 3.2%. A duration of each pulse-mode feature frame 318 is between approximately 8 and 32 ms. Each pulse-mode feature frame 318 is composed of eight radar frames 322 (e.g., L is equal to 8). Within the active pulse-mode feature frame 318, all eight radar frames 322 are in the active state. This results in the duty cycle 336 being equal to 100%. A duration of each radar frame 322 is between approximately 1 and 4 ms. An active time 328 within each of the active radar frames 322 is between approximately 32 and 128 μs. As such, the resulting duty cycle 338 is approximately 3.2%. This example radar framing structure 312 has been found to yield good performance results. These good performance results are in terms of good gesture recognition and presence detection while also yielding good power efficiency results in the application context of a handheld smartphone in a low-power state. Generation of the radar transmit signal 306 (of FIG. 3-1) and the processing of the radar receive signal 308 (of FIG. 3-1) are further described with respect to FIG. 4.

Figure 4:
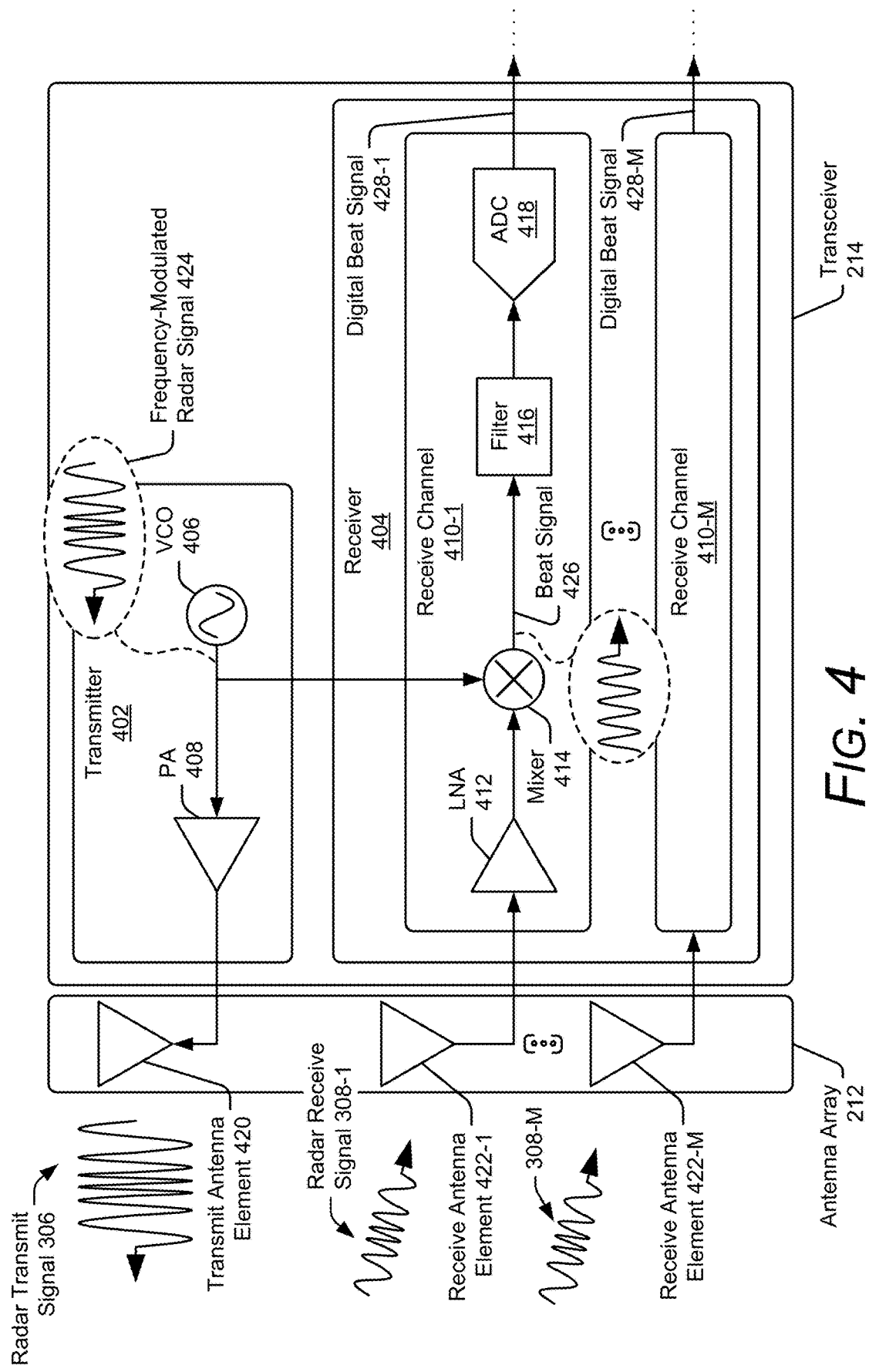
FIG. 4 illustrates an example antenna array and an example transceiver of a radar system.

FIG. 4 illustrates an example antenna array 212 and an example transceiver 214 of the radar system 102. In the depicted configuration, the transceiver 214 includes a transmitter 402 and a receiver 404. The transmitter 402 includes at least one voltage-controlled oscillator 406 (VCO 406) and at least one power amplifier 408 (PA 408). The receiver 404 includes at least two receive channels 410-1 to 410-M, where M is a positive integer greater than one. Each receive channel 410-1 to 410-M includes at least one low-noise amplifier 412 (LNA 412), at least one mixer 414, at least one filter 416, and at least one analog-to-digital converter 418 (ADC 418).

The antenna array 212 includes at least one transmit antenna element 420 and at least two receive antenna elements 422-1 to 422-M. The transmit antenna element 420 is coupled to the transmitter 402. The receive antenna elements 422-1 to 422-M are respectively coupled to the receive channels 410-1 to 410-M.

During transmission, the voltage-controlled oscillator 406 generates a frequency-modulated radar signal 424 at radio frequencies. The power amplifier 408 amplifies the frequency-modulated radar signal 424 for transmission via the transmit antenna element 420. The transmitted frequency-modulated radar signal 424 is represented by the radar transmit signal 306, which can include multiple chirps 310-1 to 310-N based on the radar framing structure 312 of FIG. 3-2. As an example, the radar transmit signal 306 is generated according to the burst-mode feature frame 320 of FIG. 3-2 and includes 16 chirps 310 (e.g., N equals 16).

During reception, each receive antenna element 422-1 to 422-M receives a version of the radar receive signal 308-1 to 308-M. In general, relative phase differences between these versions of the radar receive signals 308-1 to 308-M are due to differences in locations of the receive antenna elements 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 to generate a beat signal 426.

A frequency of the beat signal 426 represents a frequency difference between the frequency-modulated radar signal 424 and the radar receive signal 308, which is proportional to the slant range 304 of FIG. 3-1. Although not shown, the beat signal 426 can include multiple frequencies, which represents reflections from different portions of the user 302 (e.g., different fingers, different portions of a hand, or different body parts) or from different objects. In some cases, these different portions move at different speeds, move in different directions, or are positioned at different slant ranges relative to the radar system 102.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216, as shown in FIG. 5.

Figure 5:
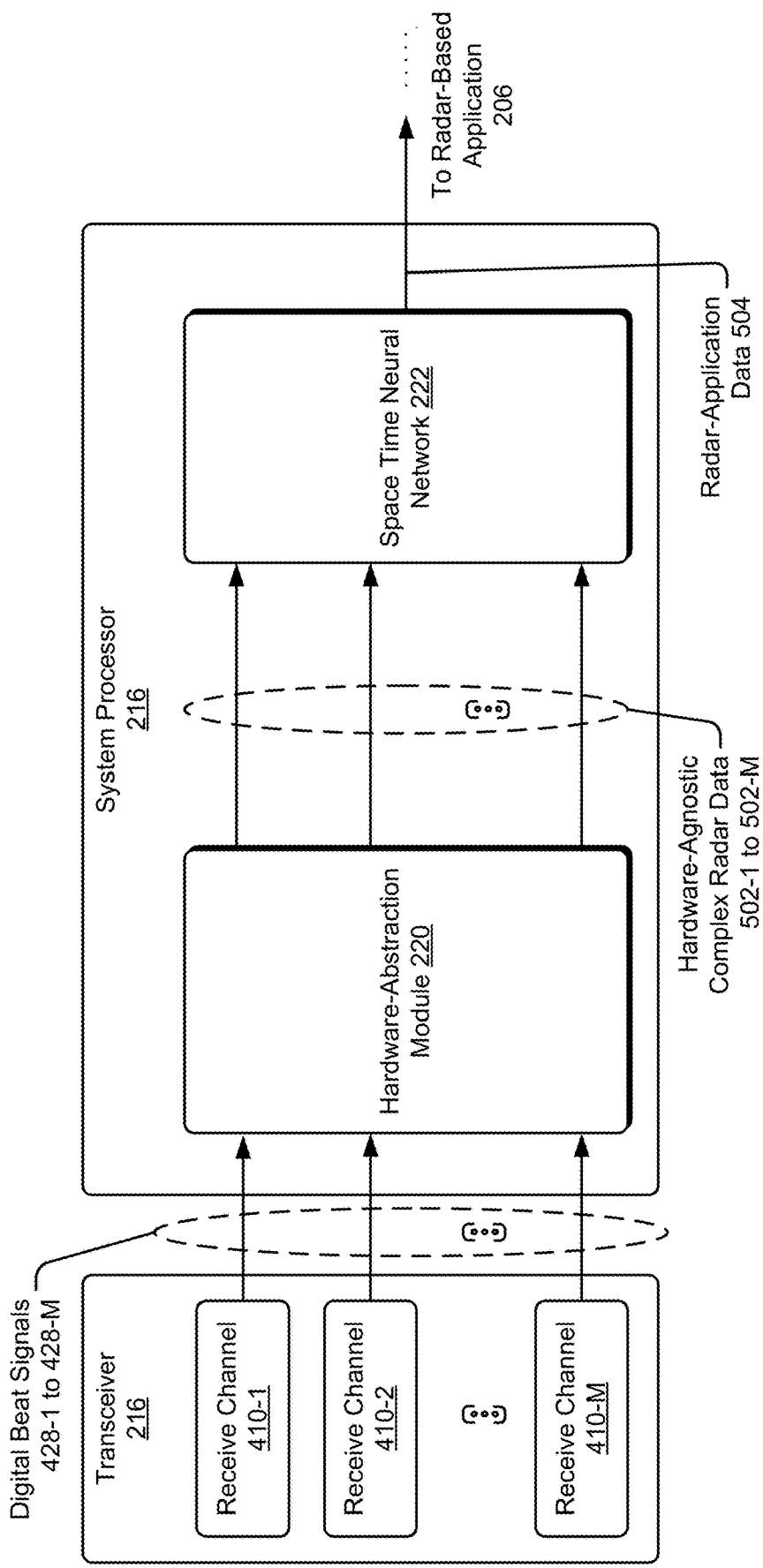
FIG. 5 illustrates an example scheme implemented by a radar system for performing gesture recognition using a space time neural network.

FIG. 5 illustrates an example scheme implemented by the radar system 102 for performing gesture recognition using the space time neural network 222. In the depicted configuration, the system processor 216 implements the hardware-abstraction module 220 and the space time neural network 222. The system processor 216 is connected to the receive channels 410-1 to 410-M. The system processor 216 can also communicate with the computer processor 202. Although not shown, the hardware-abstraction module 220 and/or the space time neural network 222 can be implemented by the computer processor 202.

In this example, the hardware-abstraction module 220 accepts the digital beat signals 428-1 to 428-M from the receive channels 410-1 to 410-M. The digital beat signals 428-1 to 428-M represent raw or unprocessed complex radar data. The hardware-abstraction module 220 performs one or more operations to generate hardware-agnostic complex radar data 502-1 to 502-M based on digital beat signals 428-1 to 428-M. The hardware-abstraction module 220 transforms the complex radar data provided by the digital beat signals 428-1 to 428-M into a form that is expected by the space time neural network 222. In some cases, the hardware-abstraction module 220 normalizes amplitudes associated with different transmit power levels or transforms the complex radar data into a frequency-domain representation.

The hardware-agnostic complex radar data 502-1 to 502-M includes both magnitude and phase information (e.g., in-phase and quadrature components). In some implementations, the hardware-agnostic complex radar data 502-1 to 502-M includes range-Doppler maps for each receive channel 410-1 to 410-M and for a particular active feature frame 316. In other implementations, the hardware-agnostic complex radar data 502-1 to 502-M includes complex interferometry data, which is an orthogonal representation of the range-Doppler maps. As another example, the hardware-agnostic complex radar data 502-1 to 502-M includes frequency-domain representations of the digital beat signals 428-1 to 428-M for an active feature frame 316. Although not shown, other implementations of the radar system 102 can provide the digital beat signals 428-1 to 428-M directly to the space time neural network 222.

The space time neural network 222 uses a trained regression or classification model to analyze the hardware-agnostic complex radar data 502-1 to 502-M and generate radar-application data 504. For a gesture-based application, the radar-application data 504 provides information regarding a gesture performed by the user 302. For example, the radar-application data 504 indicates whether the gesture performed by the user 302 is a left-swipe gesture or a right-swipe gesture. In other implementations, the radar-application data 504 indicates different probabilities associated with different types of gestures, such as a probability of a swipe gesture and a probability of a reach gesture. Although described with respect to gesture recognition, the training procedure executed by the space time neural network 222 and machine-learning architecture of the space time neural network 222 can be adapted to support other types of applications, including presence detection, collision-avoidance, and human vital-sign detection.

In some implementations, the space time neural network 222 relies on supervised learning and records measured (e.g., real) data for machine-learning training purposes. Training enables the space time neural network 222 to learn a non-linear mapping function for generating the radar-application data 504 based on the hardware-agnostic complex radar data 502-1 to 502-M. In other implementations, the space time neural network 222 relies on unsupervised learning to determine the non-linear mapping function.

An example training procedure prompts a user 302 to select and perform a particular gesture, such as a reach gesture or a swipe gesture. While the gesture is performed, the space time neural network 222 records complex radar data that is provided as input (e.g., the hardware-agnostic complex radar data 502-1 to 502-M or the digital beat signals 428-1 to 428-M). The space time neural network 222 adjusts machine-learning parameters (e.g., coefficients, weights, or biases) to recognize the gesture based on the recorded input data. The determined machine-learning parameters are stored by the system media 218 or pre-programmed into the space time neural network 222 to enable future gestures to be recognized. In some cases, this process can be repeated multiple times to enable the space time neural network 222 to account for slight variances in how the user 302 performs a gesture.

An example offline training procedure uses a motion-capture system to generate truth data for training the space time neural network 222. The motion-capture system can include multiple optical sensors, such as infrared-sensors or cameras to measure positions of multiple markers that are placed on different portions of a person's body, such as on an arm, a hand, a torso, or a head. While the person moves to different positions or performs different gestures relative to the radar system 102, the input data is recorded along with position data from the motion-capture system. The position data recorded from the motion-capture system is converted into position measurements with respect to the radar system 102 and represents truth data. Additionally or alternatively, the truth data includes the type of gesture performed. The space time neural network 222 analyzes the training data and the truth data together and adjusts machine-learning parameters to minimize errors. In some cases, the offline training procedure can provide a relatively noise-free environment and high-resolution truth data for training the space time neural network 222.

Additionally or alternatively, a real-time training procedure can use available sensors within the smart device 104 to generate truth data for training the space time neural network 222. In this case, a training procedure can be initiated by a user 302 of the smart device 104. While the user 302 moves around the smart device 104 or performs gestures, data from optical sensors (e.g., a camera or an infra-red sensor) of the smart device 104 and the radar system 102 are collected and provided to the space time neural network 222 as truth data. The real-time training procedure enables the space time neural network 222 to be tailored to the user 302, account for current environmental conditions, and account for a current position or orientation of the smart device 104.

The space time neural network 222 includes two or more artificial neural networks (e.g., neural networks). A neural network includes a group of connected nodes (e.g., neurons or perceptrons), which are organized into one or more layers. As an example, the space time neural network 222 includes a deep neural network, which includes an input layer, an output layer, and one or more hidden layers positioned between the input layer and the output layers. The nodes of the deep neural network can be partially-connected or fully connected between the layers.

In some cases, the deep neural network is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network is a feed-forward deep neural network in which the connections between the nodes do not form a cycle. Additionally or alternatively, the space time neural network 222 can include another type of neural network, such as a convolutional neural network. An example implementation of the space time neural network 222 is further described with respect to FIG. 7-1.

Figures 1, 6:
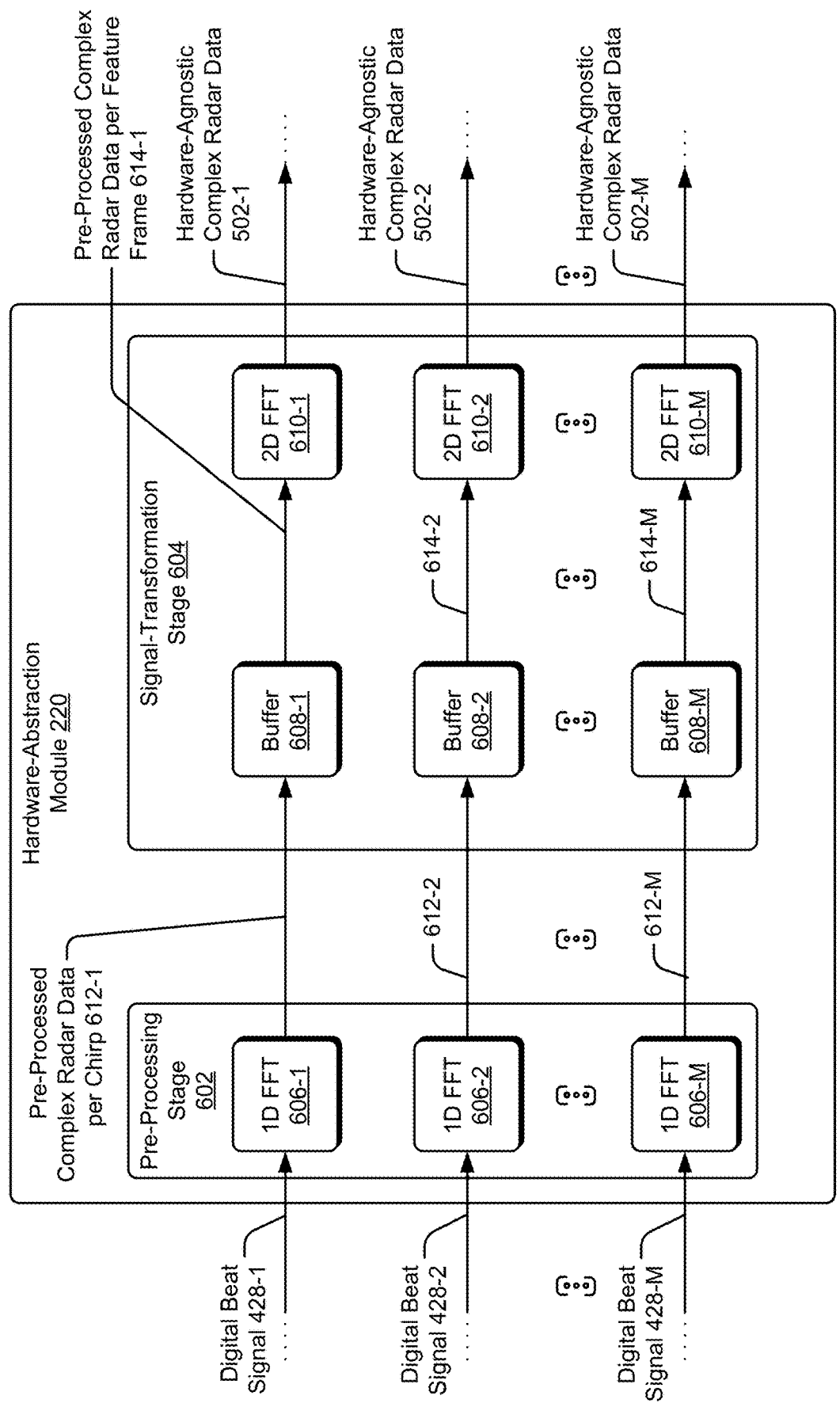
Figures 2, 6:
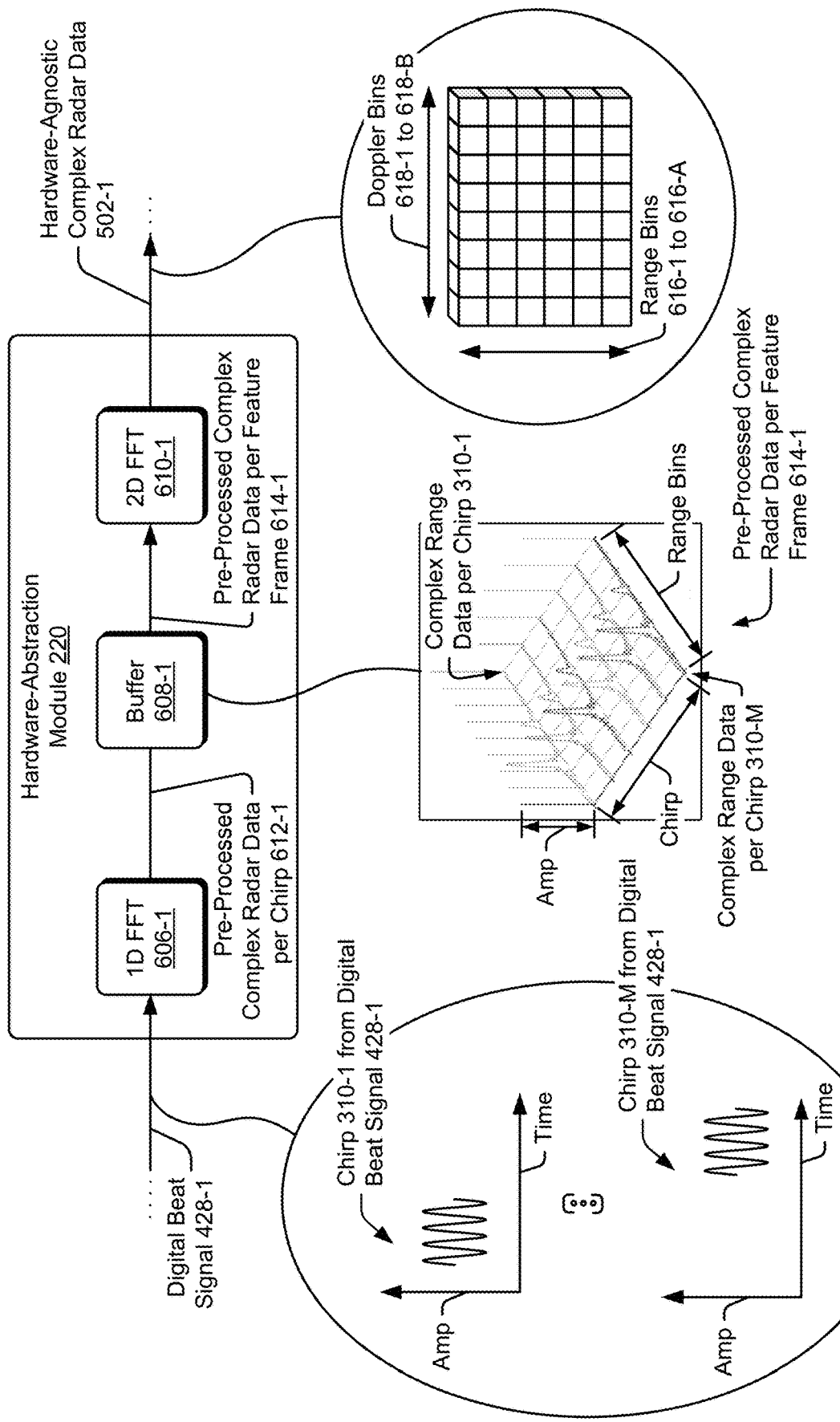

FIG. 6-1 illustrates an example hardware-abstraction module 220 for gesture recognition. In the depicted configuration, the hardware-abstraction module 220 includes a pre-processing stage 602 and a signal-transformation stage 604. The pre-processing stage 602 operates on each chirp 310-1 to 310-N within the digital beat signals 428-1 to 428-M. In other words, the pre-processing stage 602 performs an operation for each active radar frame 322. In this example, the pre-processing stage 602 includes one-dimensional (1D) Fast-Fourier Transform (FFT) modules 606-1 to 606-M, which respectively process the digital beat signals 428-1 to 428-M. Other types of modules that perform similar operations are also possible, such as a Fourier Transform module.

The signal-transformation stage 604 operates on the sequence of chirps 310-1 to 310-M within each of the digital beat signals 428-1 to 428-M. In other words, the signal-transformation stage 604 performs an operation for each active feature frame 316. In this example, the signal-transformation stage 604 includes buffers 608-1 to 608-M and two-dimensional (2D) FFT modules 610-1 to 610-M.

During reception, the one-dimensional FFT modules 606-1 to 606-M perform individual FFT operations on the chirps 310-1 to 310-M within the digital beat signals 428-1 to 428-M. Assuming the radar receive signals 308-1 to 308-M include 16 chirps 310-1 to 310-N (e.g., N equals 16), each one-dimensional FFT module 606-1 to 606-M performs 16 FFT operations to generate pre-processed complex radar data per chirp 612-1 to 612-M. As the individual operations are performed, the buffers 608-1 to 608-M store the results. Once all of the chirps 310-1 to 310-M associated with an active feature frame 316 have been processed by the pre-processing stage 602, the information stored by the buffers 608-1 to 608-M represents pre-processed complex radar data per feature frame 614-1 to 614-M for the corresponding receive channels 410-1 to 410-M.

Two-dimensional FFT modules 610-1 to 610-M respectively process the pre-processed complex radar data per feature frame 614-1 to 614-M to generate the hardware-agnostic complex radar data 502-1 to 502-M. In this case, the hardware-agnostic complex radar data 502-1 to 502-M includes complex range-Doppler maps, as further described with respect to FIG. 6-2.

FIG. 6-2 illustrates example hardware-agnostic complex radar data 502-1 generated by the hardware-abstraction module 220 for gesture recognition. The hardware-abstraction module 220 is shown to process a digital beat signal 428-1 associated with the receive channel 410-1. The digital beat signal 428-1 includes the chirps 310-1 to 310-M, which are time-domain signals. The chirps 310-1 to 310-M are passed to the one-dimensional FFT module 606-1 in an order in which they are received and processed by the transceiver 214.

As described above, the one-dimensional FFT module 606-1 performs an FFT operation on a first chirp 310-1 of the digital beat signal 428-1 at a first time. The buffer 608-1 stores a first portion of the pre-processed complex radar data 612-1, which is associated with the first chirp 310-1. The one-dimensional FFT module 606-1 continues to process subsequent chirps 310-2 to 310-N, and the buffer 608-1 continues to store the corresponding portions of the pre-processed complex radar data 612-1. This process continues until the buffer 608-1 stores a last portion of the pre-processed complex radar data 612-M, which is associated with the chirp 310-M.

At this point, the buffer 608-1 stores pre-processed complex radar data associated with a particular feature frame 614-1. The pre-processed complex radar data per feature frame 614-1 represents magnitude information (as shown) and phase information (not shown) across different chirps 310-1 to 310-N and across different range bins 616-1 to 616-A, where A represents a positive integer.

The two-dimensional FFT 610-1 accepts the pre-processed complex radar data per feature frame 614-1 and performs a two-dimensional FFT operation to form the hardware-agnostic complex radar data 502-1, which represents a range-Doppler map. The range-Doppler map includes complex radar data for the range bins 616-1 to 616-A and Doppler bins 618-1 to 618-B, where B represents a positive integer. In other words, each range bin 616-1 to 616-A and Doppler bin 618-1 to 618-B includes a complex number with real and imaginary parts that together represent magnitude and phase information. The quantity of range bins 616-1 to 616-A can be on the order of tens or hundreds, such as 64 or 128 (e.g., A equals 64 or 128). The quantity of Doppler bins can be on the order of tens or hundreds, such as 32, 64, or 124 (e.g., B equals 32, 64, or 124). The hardware-agnostic complex radar data 502-1, along with the hardware-agnostic complex radar data 502-1 to 502-M (of FIG. 6-1), are provided to the space time neural network 222, as shown in FIG. 7-1.

Figures 1, 7:
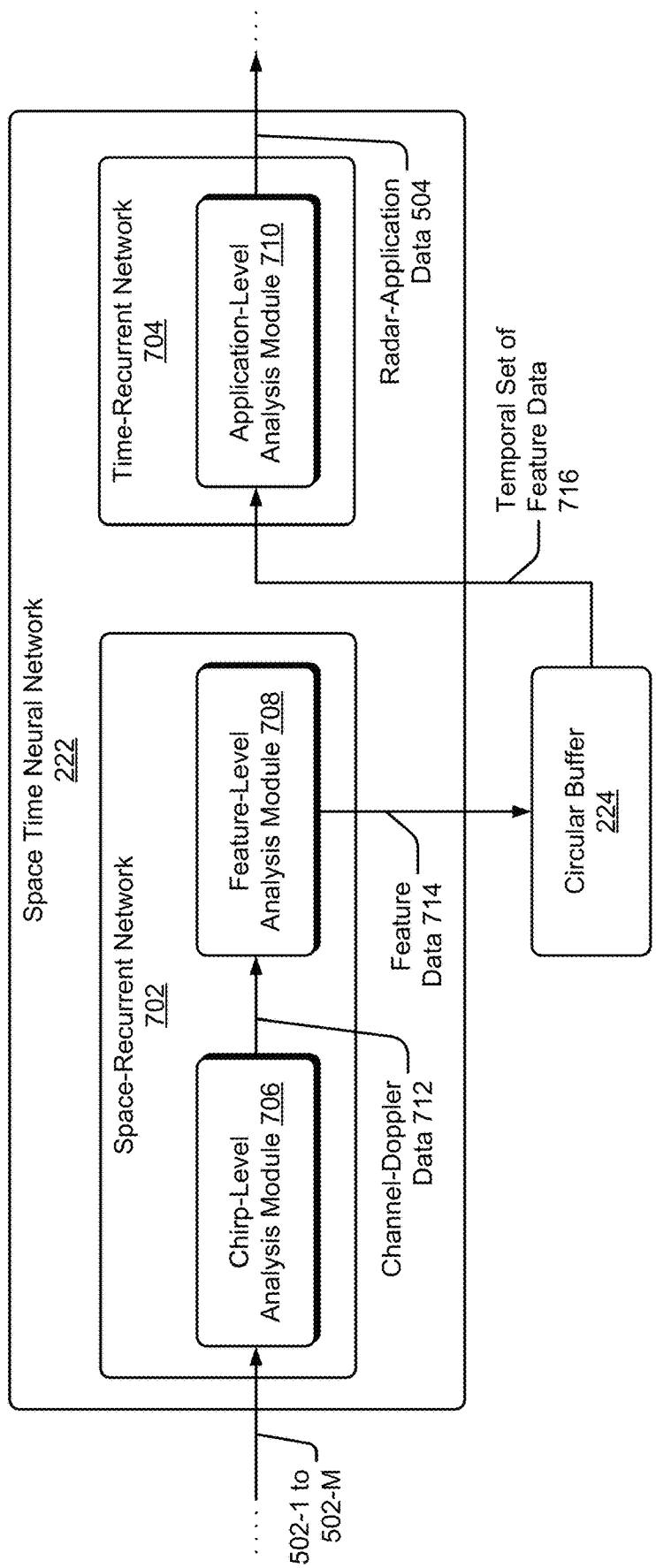
Figures 2, 7:
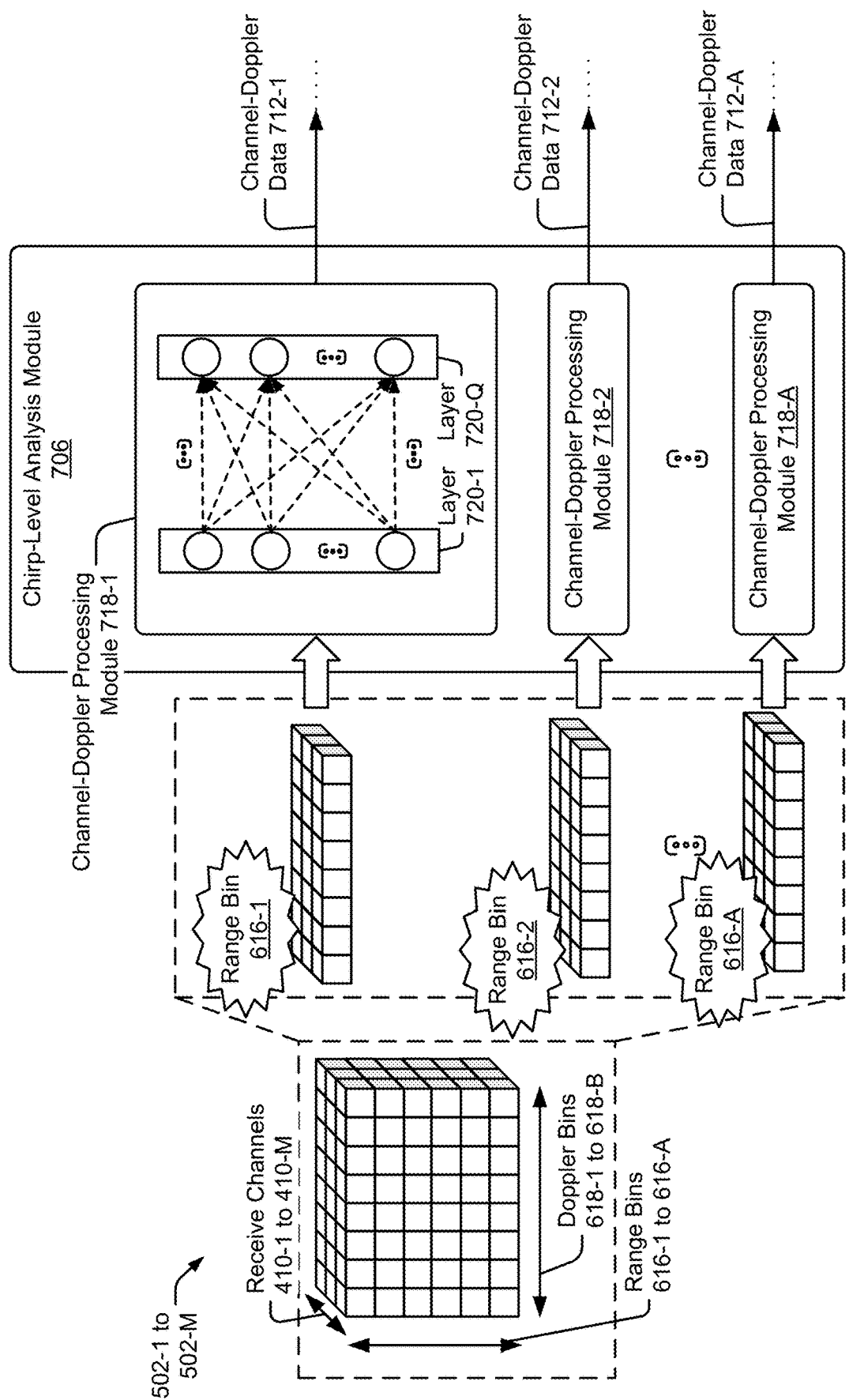
Figures 3, 7:
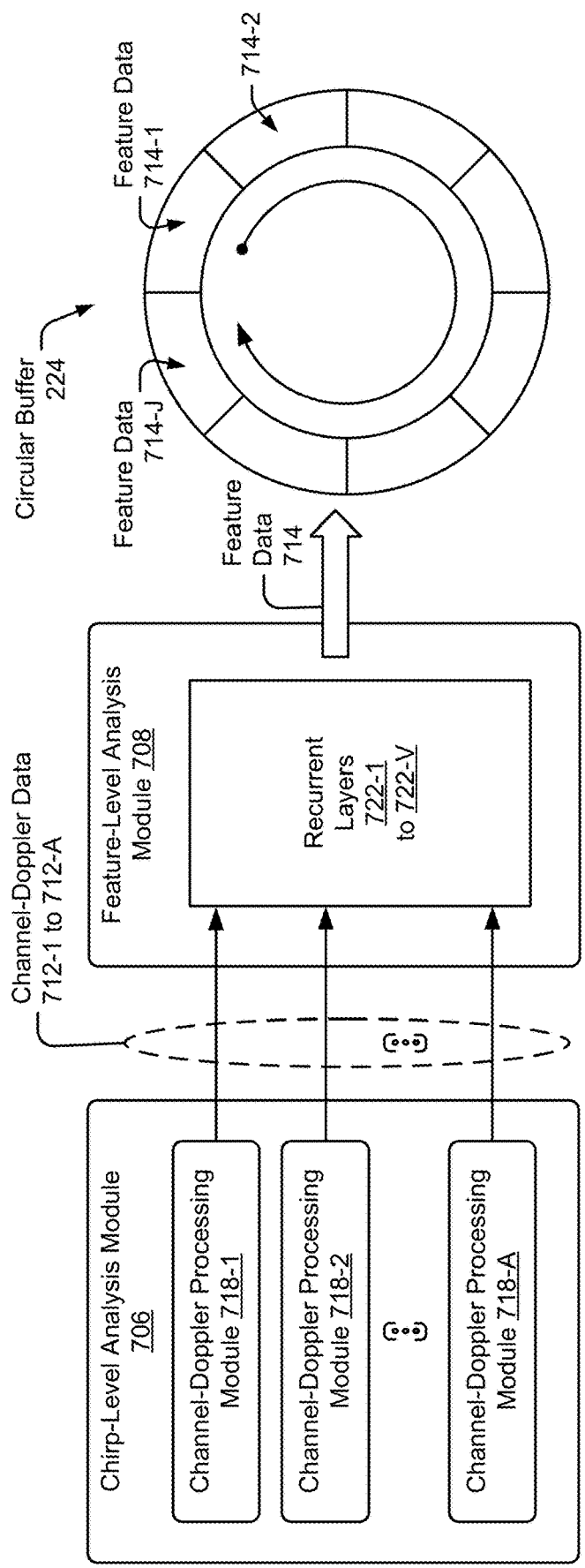
Figures 4, 7:
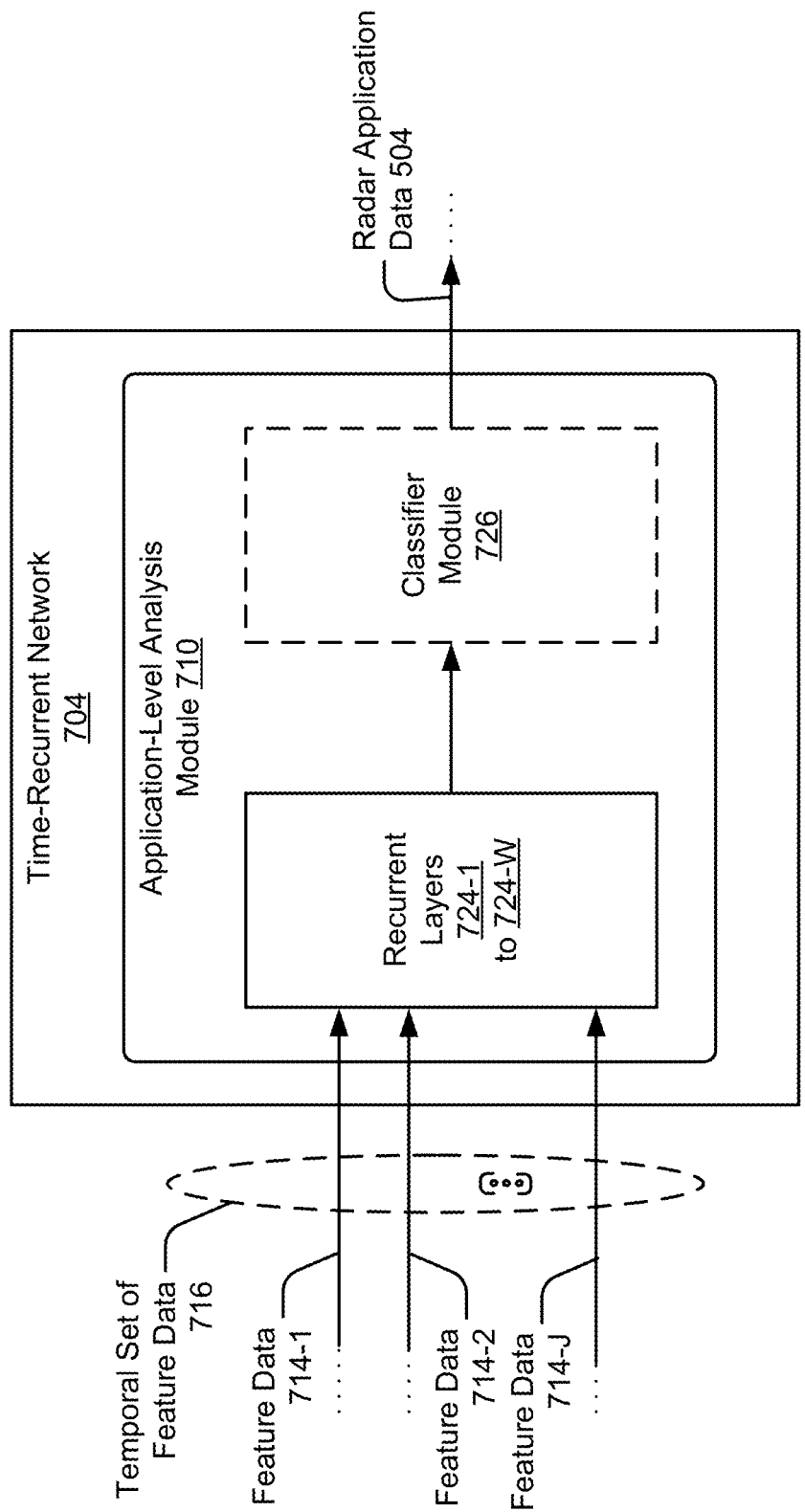

FIG. 7-1 illustrates an example space time neural network 222 for performing gesture recognition. In the depicted configuration, the space time neural network 222 includes two stages implemented by a space-recurrent network 702 and a time-recurrent network 704, respectively. The space-recurrent network 702 includes a chirp-level analysis module 706 and a feature-level analysis module 708. In general, the space-recurrent network 702 analyzes the hardware-agnostic complex radar data 502-1 to 502-M over a spatial domain for each active feature frame 316. The resulting data is stored by the circular buffer 224. The time-recurrent network 704 includes an application-level analysis module 710, which analyzes data stored within the circular buffer 224 for two or more active feature frames 316. In this manner, the time-recurrent network 704 analyzes data over a temporal domain for at least a portion of an active main frame 314. In some implementations, a size of the circular buffer 224 is customized to a duration of the active main frame 314 in order to enable all of the active feature frames 316 of the active main frame 314 to be stored. For gesture recognition, the duration of the active main frame 314 can be associated with a duration of one or more gestures. In general, the application-level analysis module 710 is designed to support one or more radar-based applications, including gesture recognition, presence detection, collision avoidance, and human vital-sign detection.

During reception, the chirp-level analysis module 706 processes the complex radar data across each range bin 616-1 to 616-A to generate channel-Doppler data 712. The feature-level analysis module 708 analyzes the channel-Doppler data 712 to generate feature data 714, which characterizes one or more features of that are relevant for the application-level analysis module 710. For example, the feature data 714 can characterize features of a gesture performed by the user 302 for gesture recognition. The circular buffer 224 stores the feature data 714.

Over time, the circular buffer 224 stores feature data 714 associated with different active feature frames 316. Feature data 714 associated with two or more active feature frames 316 is referred to as a temporal set of feature data 716. The temporal set of feature data 716 is provided to or accessed by the application-level analysis module 710. The application-level analysis module 710 analyzes the temporal set of feature data 716 to generate radar-application data 504. As an example, the radar-application data 504 includes a prediction regarding the type of gesture performed by the user 302. As feature data 714 associated with larger quantities of active feature frames 316 are stored by the circular buffer 224, an accuracy of the predictions improves. In some cases, the application-level analysis module 710 continually generates or updates the radar-application data 504 as subsequent feature frames 316 associated with a main frame 314 are processed by the space-recurrent network 702. Alternatively, the application-level analysis module 710 delays generation of the radar-application data 504 until all (or at least a portion) of the feature frames 316 associated with the main frame 314 have been processed by the space-recurrent network 702. Implementations of the chirp-level analysis module 706, the feature-level analysis module 708, and the application-level analysis module 710 are further described with respect to FIGS. 7-2 to 7-4.

FIG. 7-2 illustrates an example chirp-level analysis module 706 of the space time neural network 222. In the depicted configuration, the chirp-level analysis module 706 includes channel-Doppler processing modules 718-1 to 718-A. Each channel-Doppler processing module 718-1 to 718-A includes a neural network with one or more layers 720-1 to 720-Q, where Q is a positive integer. The value of Q can vary depending on the implementation. As an example, Q can equal 2, 4, or 10. The layers 720-1 to 720-Q can be fully connected, partially connected, connected in a feed-forward manner, and/or connected in a recursive manner. Nodes within the layers 720-1 to 720-Q can execute a non-linear rectifier activation function, for instance. The channel-Doppler processing modules 718-1 to 718-A can also perform additions and multiplications.

The channel-Doppler processing modules 718-1 to 718-A accept respective portions of the hardware-agnostic complex radar data 502-1 to 502-M according to the range bins 616-1 to 616-A. In particular, the channel-Doppler processing module 718-1 accepts the complex radar data associated with the first range bin 616-1 across all of the receive channels 410-1 to 410-M and across all of the Doppler bins 618-1 to 618-B. Each complex number is provided as an input to individual nodes of the layer 720-1. The layers 720-1 to 720-Q analyze the data using the non-linear rectifier activation function to generate channel-Doppler data 712-1. Similar operations are also performed by the channel-Doppler processing modules 718-2 to 718-A. The combined channel-Doppler data 712-1 to 712-A represents a vector. For example, assuming there are three receive channels 410-1 to 410-M (e.g., M equals 3), 32 Doppler bins 618-1 to 618-B (e.g., B equals 32) and 16 range bins 616-1 to 616-A (e.g., A equals 16), the channel-Doppler data 712-1 to 712-A forms a 1×16 vector of values, which represents a relationship across the receive channels in the Doppler domain to enable the feature-level analysis module 708 to identify one or more features of a gesture.

FIG. 7-3 illustrates an example feature-level analysis module 708 of the space time neural network 222. In the depicted configuration, the feature-level analysis module 708 is implemented using one or more recurrent layers 722-1 to 722-V, where V represents a positive integer. Within the recurrent layers 722-1 to 722-V, connections between the nodes form a cycle, which retains information from a previous active feature frame 316 for a subsequent active feature frame 316. Using the recurrent layers 722-1 to 722-V, the feature-level analysis module 708 can implement a long-short-term memory (LSTM) network or some other temporal convolution network.

As described above, the feature-level analysis module 708 processes the channel-Doppler data 712-1 to 712-A across the range bins 616-1 to 616-A to generate the feature data 714. Although not shown, some implementations of the space-recurrent network 702 can include additional fully-connected layers 720 connected to outputs of the recurrent layer 722-V. Similar to the layers 720 of the chirp-level analysis module 706, these layers 720 can also perform non-linear transformations.

Over time, feature data 714-1 to 714-J associated with active feature frames 316-1 to 3164 are sequentially stored by the circular buffer 224 in different memory elements. The feature data 714-1 to 714-J represents the temporal set of feature data 716, which is processed by the application-level analysis module 708, as further described with respect to FIG. 7-4.

FIG. 7-4 illustrates an example application-level analysis module 710 of the space time neural network 222. In the depicted configuration, the application-level analysis module 708 is implemented using one or more recurrent layers 724-1 to 724-W, where W represents a positive integer that may or may not be equal to V. Using the recurrent layers 724-W to 724-W, the application-level analysis module 710 can implement a long-short-term memory (LSTM) network or temporal convolution network. The application-level analysis module 710 can optionally include a classifier module 726, which represents one or more layers of the application-level analysis module 710. For gesture recognition, the classifier module 726 can distinguish between different types of gestures, such as a left-swipe gesture, a right-swipe gesture, or a reach gesture. In some implementations, the classifier module 726 has multiple heads (e.g., multiple sub-modules), which can support different radar-based applications. For example, a first head can detect the presence of the user 302 to support presence detection while a second head detects gestures performed by the user 302 to support gesture recognition.

The application-level analysis module 710 processes two or more feature data 714-1 to 714-J stored within the circular buffer 224. For gesture recognition, the application-level analysis module 710 forms a prediction regarding the type of gesture performed based on two or more of the feature data 714-1 to 714-J. In some cases, the application-level analysis module 710 can wait to form the prediction until a specified quantity of feature data 714-1 to 714-J is available, such as 15. If the active main frame 314 includes more than 15 active feature frames 316 (e.g., J is greater than 15), the application-level analysis module 710 can continue to update its prediction based on the last 15 active feature frames 316. In general, an accuracy of the prediction increases over time or when larger quantities of feature data 714-1 to 714-J is analyzed.

Optionally, the classifier module 726 can further refine the prediction made using the recurrent layers 724-1 to 724-W. For example, the classifier module 726 can distinguish between different directional swipes as they pertain to an orientation of the smart device 104. In particular, the classifier module 726 can determine whether the swipe gesture is a swipe-up gesture in portrait mode or a left-swipe gesture in landscape mode. To implement this logic, the classifier module 726 can include at least one fully-connected layer with class nodes that activate according to the type of gesture detected by the classifier module 726.

Although described with respect to radar systems, the space time neural network 222 can be modified to operate with data provided by other types of sensors or electromagnetic systems. In general, these sensors or electromagnetic systems have the ability to encode one or more properties of a signal that propagates through space, such as an amplitude, phase, or frequency of the signal. Examples include a Bluetooth™ system, a WiGig™ systems, an ultrasonic sensor, a lidar sensor, and so forth.

Example Method

Figure 8:
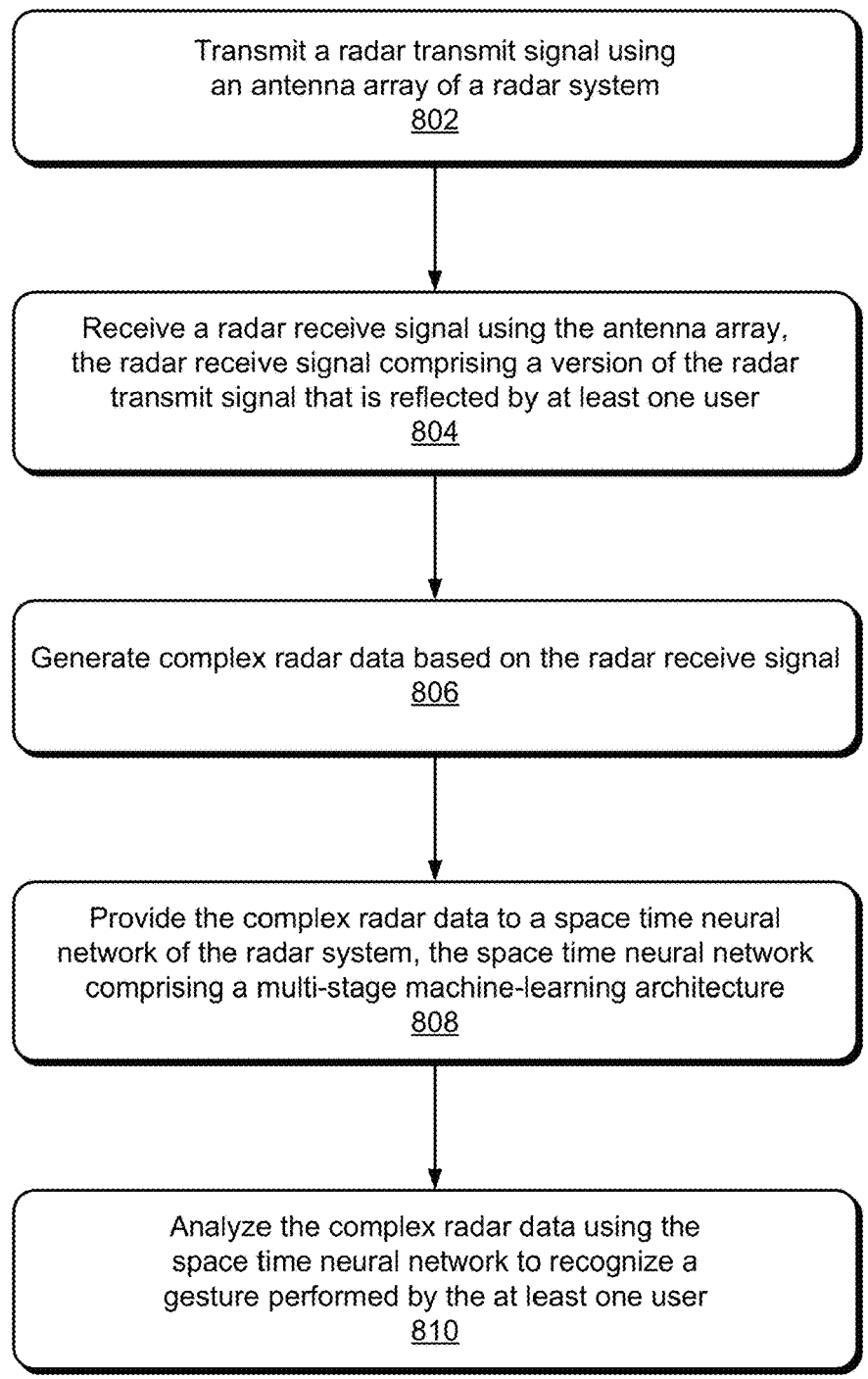
FIG. 8 illustrates an example method for performing operations of a smart-device-based radar system capable of performing gesture recognition using a space time neural network.

FIG. 8 depicts an example method 800 for performing operations of a smart-device-based radar system capable of performing gesture recognition using a space time neural network 222. Method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIG. 4 or 5, reference to which is made for example only. The techniques are not limited to performance by one entity or multiple entities operating on one device.

At 802, a radar transmit signal is transmitted using an antenna array of a radar system. For example, the radar system 102 uses at least one transmit antenna element 420 to transmit the radar transmit signal 306, as shown in FIG. 4. In some implementations, the radar transmit signal 306 includes multiple chirps 310-1 to 310-N, whose frequencies are modulated, as shown in FIG. 3.

At 804, a radar receive signal is received using the antenna array. The radar receive signal comprises a version of the radar transmit signal that is reflected by at least one user. For example, the radar system 102 uses at least one receive antenna element 422 to receive a version of the radar receive signal 308 that is reflected by the user 302, as shown in FIG. 4.

At 806, complex radar data is generated based on the radar receive signal. For example, a receive channel 410 of the radar system 102 generates a digital beat signal 428 based on the radar receive signal 308. The digital beat signal represents a complex radar data and includes both magnitude and phase information (e.g., in-phase and quadrature information).

At 808, the complex radar data is provided to a space time neural network of the radar system. The space time neural network comprises a multi-stage machine-learning architecture. For example, the receive channels 410-1 to 410-M provide (e.g., directly provide or indirectly provide through the hardware-abstraction module 220) the digital beat signals 428-1 to 428-M to the space time neural network 222, as shown in FIG. 5. The space time neural network 222 comprises a multi-stage machine-learning architecture, which includes the space-recurrent network 702 and the time-recurrent network 704 of FIG. 7-1. The space-recurrent network 702 represents a first stage of the space time neural network 222 and analyzes the complex radar data over a spatial domain. The time-recurrent network 704 represents a second stage of the space time neural network 222 and analyzes the data provided by the space-recurrent network 702 over a temporal domain.

At 810, the complex radar data is analyzed using the space time neural network to recognize a gesture performed by the at least one user. For example, the space time neural network 222 analyzes the digital beat signals 428-1 to 428-M or the hardware-agnostic complex radar data 502-1 to 502-M to generate the radar-application data 504, which identifies the gesture performed by the user 302. Although described for gesture recognition, similar operations can also be performed for other applications, including presence detection, collision avoidance, vital sign detection, and so forth.

Example Computing System

Figure 9:
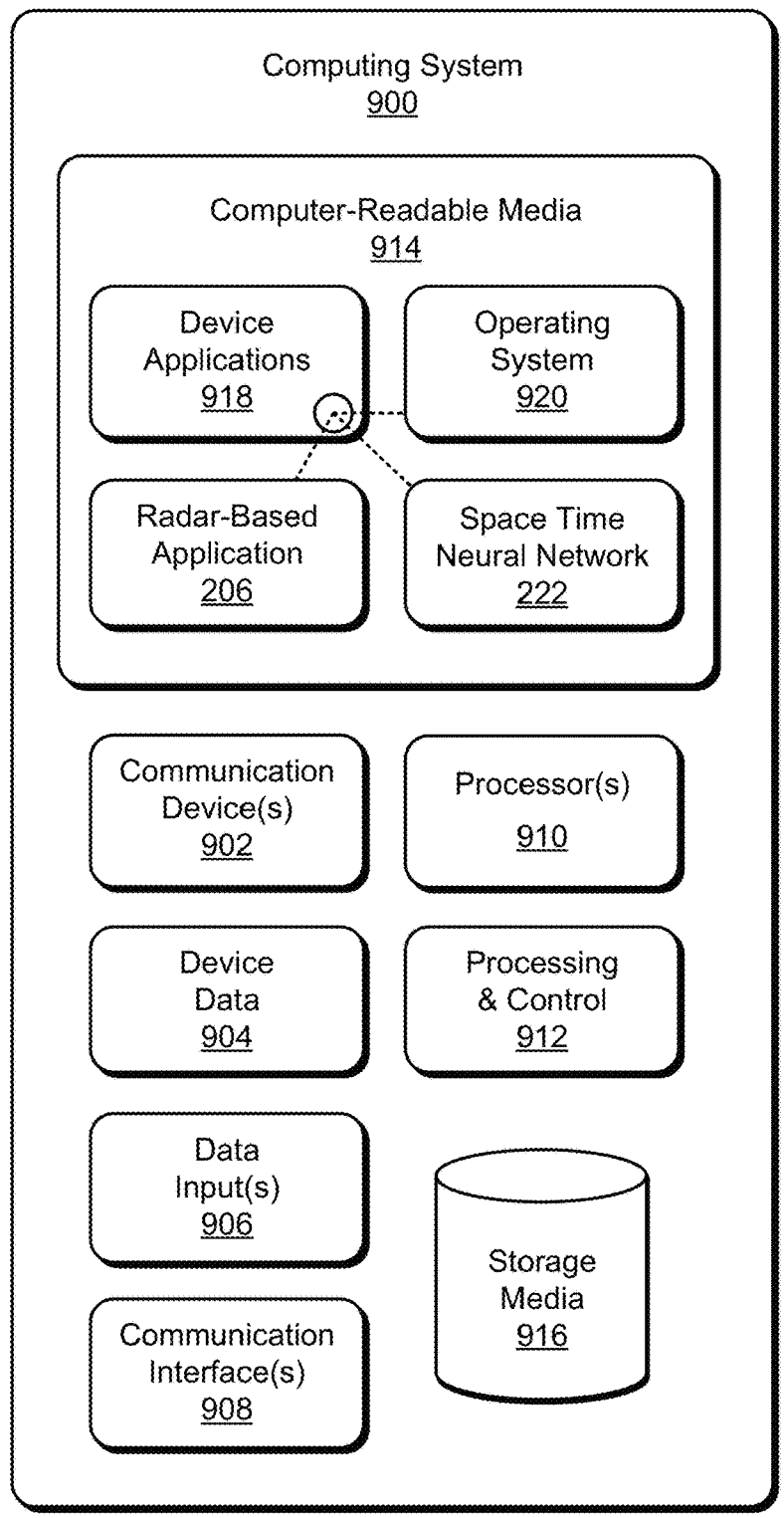
FIG. 9 illustrates an example computing system embodying, or in which techniques may be implemented that enable use of, a radar system capable of performing gesture recognition using a space time neural network.

FIG. 9 illustrates various components of an example computing system 900 that can be implemented as any type of client, server, and/or computing device as described with reference to the previous FIG. 2 to implement gesture recognition using a space time neural network 222.

The computing system 900 includes communication devices 902 that enable wired and/or wireless communication of device data 904 (e.g., received data, data that is being received, data scheduled for broadcast, or data packets of the data). Although not shown, the communication devices 902 or the computing system 900 can include one or more radar systems 102. The device data 904 or other device content can include configuration settings of the device, media content stored on the device, and/or information associated with a user 302 of the device. Media content stored on the computing system 900 can include any type of audio, video, and/or image data. The computing system 900 includes one or more data inputs 906 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between the computing system 900 and a communication network by which other electronic, computing, and communication devices communicate data with the computing system 900.

The computing system 900 includes one or more processors 910 (e.g., any of microprocessors, controllers, and the like), which process various computer-executable instructions to control the operation of the computing system 900 and to enable techniques for, or in which can be embodied, gesture recognition in the presence of saturation. Alternatively or in addition, the computing system 900 can be implemented with any one or combination of hardware, firmware, or fixed logic circuitry that is implemented in connection with processing and control circuits which are generally identified at 912. Although not shown, the computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 900 also includes a computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 900 can also include a mass storage media device (storage media) 916.

The computer-readable media 914 provides data storage mechanisms to store the device data 904, as well as various device applications 918 and any other types of information and/or data related to operational aspects of the computing system 900. For example, an operating system 920 can be maintained as a computer application with the computer-readable media 914 and executed on the processors 910. The device applications 918 may include a device manager, such as any form of a control application, software application, signal-processing and control module, code that is native to a particular device, a hardware abstraction layer for a particular device, and so on.

The device applications 918 also include any system components, engines, or managers to implement angular estimation using machine learning. In this example, the device applications 918 includes the radar-based application 206 and the space time neural network 222 of FIG. 2.

CONCLUSION

Although techniques using, and apparatuses including, a smart-device-based radar system performing gesture recognition using a space time neural network have been described in language specific to features and/or methods, it is to be understood that the subject of the appended claims is not necessarily limited to the specific features or methods described. Rather, the specific features and methods are disclosed as example implementations of a smart-device-based radar system performing gesture recognition using a space time neural network.

Some examples are described below.

Example 1

A method performed by a radar system, the method comprising:
transmitting a radar transmit signal using an antenna array of the radar system;
receiving a radar receive signal using the antenna array, the radar receive signal comprising a version of the radar transmit signal that is reflected by at least one user;
generating complex radar data based on the radar receive signal;
providing the complex radar data to a space time neural network of the radar system, the space time neural network comprising a multi-stage machine-learning architecture; and
analyzing the complex radar data using the space time neural network to recognize a gesture performed by the at least one user.

Example 2

The method of example 1, wherein:
the analyzing of the complex radar data comprises analyzing both magnitude and phase information of the complex radar data using machine-learning techniques to recognize the gesture.

Example 3

The method of example 1 or 2, wherein:
the multi-stage machine-learning architecture comprises a space-recurrent network and a time-recurrent network; and
wherein the analyzing of the complex radar data comprises:
analyzing, using the space-recurrent network, the complex radar data over a spatial domain to generate feature data associated with the gesture; and
analyzing, using the time-recurrent network, the feature data over a temporal domain to recognize the gesture.

Example 4

The method of example 3, further comprising:
storing the feature data within a circular buffer; and
accessing, by the time-recurrent network, the feature data stored within the circular buffer.

Example 5

The method of example 3 or 4, wherein the analyzing of the complex radar data over the spatial domain comprises:
separately processing portions of the complex radar data associated with different range bins using a non-linear activation function to generate channel-Doppler data for each range bin; and
analyzing the channel-Doppler data across the different range bins to generate the feature data.

Example 6

The method of any of examples 3 to 5, wherein the analyzing of the feature data over the temporal domain comprises forming a prediction regarding the gesture by analyzing the feature data associated with at least two different time frames.

Example 7

The method of any of examples 3 to 6, wherein the space-recurrent network comprises a chirp-level analysis module and a feature-level analysis module.

Example 8

The method of any of examples 3 to 7, wherein the time-recurrent network comprises an application-level analysis module.

Example 9

The method of any preceding example, wherein the complex radar data comprises at least one of the following:
a complex range-Doppler map;
complex interferometry data;
multiple digital beat signals associated with the radar receive signal; or
frequency-domain representations of the multiple digital beat signals.

Example 10

The method of any Preceding Example, wherein the Gesture Comprises at Least One of the Following:
a swipe gesture;
a reach gesture;
a knob-turning gesture; or
a spindle-twisting gesture.

Example 11

The method of any preceding example, wherein:
the receiving of the radar receive signal comprises receiving multiple versions of the radar receive signal using different antenna elements of the radar system; and
the generating of the complex radar data comprises generating digital beat signals using respective receive channels of the radar system, the respective receive channels connected to the different antenna elements, respectively.

Example 12

The method of any of the examples 4 to 11, wherein the feature data processed by the space-recurrent network is stored by the circular buffer and a temporal set of feature data is accessed by the time-recurrent network.

Example 13

An apparatus comprising:
a radar system comprising:
an antenna array;
a transceiver; and
a processor and computer-readable storage media configured to perform any of the methods of examples 1 to 12.

Example 14

The apparatus of example 13, wherein the apparatus comprises a smart device, the smart device comprising one of the following:

a smartphone;
a smart watch;
a smart speaker;
a smart thermostat;
a security camera;
a vehicle; or
a household appliance.

Example 15

A computer-readable storage media comprising computer-executable instructions that, responsive to execution by a processor, implement:
  a space time neural network configured to:
    accept complex radar data associated with a radar receive signal that is reflected by at least one object;
    analyze the complex radar data over a spatial domain to generate feature data;
    analyze the feature data over a temporal domain to generate radar-application data; and
    pass the radar-application data to a radar-based application.

Example 16

The computer-readable storage media of example 15, wherein the space time neural network is further configured to analyze both magnitude and phase information of the complex radar data to generate the radar-application data.

Example 17

The computer-readable storage media of example 15 or 16, wherein:
  the at least one object comprises a user;
  the radar-application data identifies a gesture performed by the user; and
  the computer-executable instructions, responsive to execution by the processor, implement the radar-based application configured to:
    accept the radar-application data; and
    display content to the user based on the identified gesture.

Example 18

The computer-readable storage media of example 17, wherein the space time neural network is further configured to:
  prompt the user to perform the gesture;
  record the complex radar data as training data while the user performs the gesture; and
  execute a training procedure to recognize a future gesture performed by the user.

Example 19

The computer-readable storage media of example 15 or 16, wherein:
  the at least one object comprises a stylus; and
  the radar-application data identifies a gesture performed by a user using the stylus.

Example 20

The computer-readable storage media of example 15 or 16, wherein:
  the at least one object comprises an inanimate object and a user;
  the radar-application data identifies a potential collision between the inanimate object and the user; and
  the computer-executable instructions, responsive to execution by the processor, implement a radar-based application configured to:
    accept the radar-application data; and
    alert the user to the potential collision.

Example 21

The computer-readable storage media of example 15 or 16, wherein:
  the at least one object comprises a user;
  the radar-application data includes a measured vital sign of the user; and
  the computer-executable instructions, responsive to execution by the processor, implement a radar-based application configured to:
    accept the radar-application data; and
    inform the user of the measured vital sign.

Example 22

The computer-readable storage media of any of examples 15 to 21, wherein the computer-executable instructions, responsive to execution by the processor, implement a hardware-abstraction module configured to:
  generate hardware-agnostic complex radar data based on the complex radar data; and
  provide, to the space time neural network, the hardware-agnostic complex radar data as the complex radar data.

Example 23

A computer-readable storage media comprising computer-executable instructions that, responsive to execution by a processor, implement:
  a space time neural network comprising a multi-stage machine-learning architecture, the space time neural network configured to:
    accept complex radar data associated with a radar receive signal that is reflected by at least one object; and
    analyze the complex radar data to recognize a gesture performed by the at least one user.

Example 24

The computer-readable storage media of example 23, wherein the space time neural network is further configured to:
  analyze the complex radar data over a spatial domain to generate feature data;
  analyze the feature data over a temporal domain to generate radar-application data; and
  pass the radar-application data to a radar-based application.

The invention claimed is:
1. A method performed by a radar system, the method comprising:
  transmitting a radar transmit signal using an antenna array of the radar system;

receiving a radar receive signal using the antenna array, the radar receive signal comprising a version of the radar transmit signal that is reflected by at least one user;

generating complex radar data based on the radar receive signal;

providing the complex radar data to a space time neural network of the radar system, the space time neural network comprising a space-recurrent network and a time-recurrent network; and analyzing the complex radar data using the space time neural network to recognize a gesture performed by the at least one user, the analyzing of the complex radar data comprising:

generating channel-Doppler data for each range bin associated with the complex radar data by separately processing portions of the complex radar data associated with different range bins using the space-recurrent network;

generating feature data associated with the gesture by analyzing the channel-Doppler data across the different range bins using the space-recurrent network; and forming a prediction regarding the gesture by analyzing the feature data associated with at least two different time frames using the time-recurrent network.

2. The method of claim 1, wherein:
the analyzing of the complex radar data comprises analyzing both magnitude and phase information of the complex radar data using machine-learning techniques to recognize the gesture.

3. The method of claim 1, further comprising:
storing the feature data within a circular buffer; and
accessing, by the time-recurrent network, the feature data stored within the circular buffer.

4. The method of claim 1, wherein the separately processing portions of the complex radar data comprises separately processing portions of the complex radar data associated with the different range bins using a non-linear activation function to generate the channel-Doppler data for each range bin.

5. The method of claim 1, wherein the complex radar data comprises at least one of the following:
a complex range-Doppler map;
complex interferometry data;
multiple digital beat signals associated with the radar receive signal; or
frequency-domain representations of the multiple digital beat signals.

6. The method of claim 1, wherein the gesture comprises at least one of the following:
a swipe gesture;
a reach gesture;
a knob-turning gesture; or
a spindle-twisting gesture.

7. The method of claim 1, wherein:
the receiving of the radar receive signal comprises receiving multiple versions of the radar receive signal using different antenna elements of the radar system; and
the generating of the complex radar data comprises generating digital beat signals using respective receive channels of the radar system, the respective receive channels connected to the different antenna elements, respectively.

8. An apparatus comprising:
a radar system comprising:
an antenna array;
a transceiver configured to:
transmit a radar transmit signal using the antenna array;
receive a radar receive signal using the antenna array, the radar receive signal comprising a version of the radar transmit signal that is reflected by at least one user; and
generate complex radar data based on the radar receive signal; and
a processor and computer-readable storage medium configured to implement a space time neural network configured to:
accept the complex radar data;
generate channel-Doppler data for each range bin associated with the complex radar data by separately processing portions of the complex radar data associated with different range bins using a space-recurrent network of the space time neural network;
generate feature data associated with a gesture performed by the at least one user by analyzing the channel-Doppler data across the different range bins using the space-recurrent network; and
form a prediction regarding the gesture by analyzing the feature data associated with at least two different time frames using a time-recurrent network of the space time neural network.

9. The apparatus of claim 8, wherein the apparatus comprises a smart device, the smart device comprising one of the following:
a smartphone;
a smart watch;
a smart speaker;
a smart thermostat;
a security camera;
a vehicle; or
a household appliance.

10. The apparatus of claim 8, further comprising:
a circular buffer configured to store the feature data,
wherein the space time neural network is configured to form the prediction by accessing the feature data stored within the circular buffer using the time-recurrent network.

11. The apparatus of claim 8, wherein:
the antenna array comprises multiple antenna elements; and
the transceiver is configured to:
receive multiple versions of the radar receive signal using the multiple antenna elements; and
generate the complex radar data based on the multiple versions of the radar receive signal.

12. The apparatus of claim 8, wherein:
the space time neural network is configured to recognize the gesture based on the prediction; and
the gesture comprises at least one of the following:
a swipe gesture;
a reach gesture;
a knob-turning gesture; or
a spindle-twisting gesture.

13. A non-transitory computer-readable storage medium comprising computer-executable instructions that, responsive to execution by a processor, implement:
a space time neural network configured to:
accept complex radar data associated with a radar receive signal that is reflected by at least one object;
generate channel-Doppler data for each range bin associated with the complex radar data by separately processing portions of the complex radar data associated with different range bins using a space-recurrent network of the space time neural network;
generate feature data associated with a gesture performed using the object by analyzing the channel-Doppler data across the different range bins using the space-recurrent network of the space time neural network; and
form a prediction regarding the gesture by analyzing the feature data associated with at least two different time frames using a time-recurrent network of the space time neural network.

14. The computer-readable storage medium of claim 13, wherein:
the space time neural network is further configured to recognize the gesture based on the prediction; and
the gesture comprises at least one of the following:
a swipe gesture;
a reach gesture;
a knob-turning gesture; or
a spindle-twisting gesture.

15. The computer-readable storage medium of claim 14, wherein:
the at least one object comprises a user;
the space time neural network is configured to communicate the recognized gesture to a radar-based application and
the computer-executable instructions, responsive to execution by the processor, implement the radar-based application configured to display content to the user based on the recognized gesture.

16. The computer-readable storage medium of claim 15, wherein the space time neural network is further configured to:
prompt the user to perform the gesture;
record the complex radar data as training data while the user performs the gesture; and
execute a training procedure to recognize a future gesture performed by the user.

17. The computer-readable storage medium of claim 13, wherein:
the at least one object comprises a stylus; and
the gesture is performed by a user using the stylus.

18. The computer-readable storage medium of claim 13, wherein:
the at least one object comprises an inanimate object and a user;
the space time neural network is configured to identify a potential collision between the inanimate object and the user based on the prediction; and
the computer-executable instructions, responsive to execution by the processor, implement a radar-based application configured to alert the user to the potential collision.

19. The computer-readable storage media medium of claim 13, wherein:
the at least one object comprises a user;
the space time neural network is configured to measure a vital sign of the user; and
the computer-executable instructions, responsive to execution by the processor, implement a radar-based application configured to inform the user of the measured vital sign.

20. The computer-readable storage medium of claim 13, wherein the computer-executable instructions, responsive to execution by the processor, implement a hardware-abstraction module configured to:
generate hardware-agnostic complex radar data based on the complex radar data; and
provide, to the space time neural network, the hardware-agnostic complex radar data as the complex radar data.

* * * * *

UNITED STATES PATENT AND TRADEMARK OFFICE
CERTIFICATE OF CORRECTION

| | | |
|---|---|---|
| PATENT NO. | : 12,158,991 B2 | Page 1 of 1 |
| APPLICATION NO. | : 17/634857 | |
| DATED | : December 3, 2024 | |
| INVENTOR(S) | : Michal Matuszak et al. | |

It is certified that error appears in the above-identified patent and that said Letters Patent is hereby corrected as shown below:

In the Claims

Column 30, Line 23, Claim 19, after "storage" before "medium", delete "media"

Signed and Sealed this
Seventh Day of January, 2025

Derrick Brent
*Acting Director of the United States Patent and Trademark Office*